United States Patent [19]

Meek et al.

[11] Patent Number: 5,602,744
[45] Date of Patent: Feb. 11, 1997

[54] UNIVERSAL SEND/RECEIVE UTILITY USAGE DATA GATHERING SYSTEM

[76] Inventors: Jean L. Meek, 22871 County Rd. 448, Lindale, Tex. 75771; J. Travis Sparks, 15708 Timberhill Dr., Flint, Tex. 75762

[21] Appl. No.: 315,142

[22] Filed: Sep. 29, 1994

[51] Int. Cl.[6] .............................. G06F 17/00; G06G 7/48
[52] U.S. Cl. .................. 364/464.22; 340/870.02
[58] Field of Search .......................... 364/514 R, 923.2, 364/483, 464.04, 940, 940.81, 920; 340/505, 870.01, 870.02; 324/103 R; 395/285, 286, 831

[56] References Cited

U.S. PATENT DOCUMENTS

| | | | |
|---|---|---|---|
| 4,132,981 | 1/1979 | White | 340/203 |
| 4,388,690 | 6/1983 | Lumsden | 364/483 |
| 4,463,354 | 7/1984 | Sears | 340/870.02 |
| 4,614,945 | 9/1986 | Brunius et al. | 340/870.03 |
| 4,758,836 | 7/1988 | Scuilli | 340/870.31 |
| 4,787,028 | 11/1988 | Finfrock et al. | 364/200 |
| 4,833,618 | 5/1989 | Verma et al. | 364/483 |
| 5,111,407 | 5/1992 | Galpern | 364/483 |
| 5,239,662 | 8/1993 | Danielson et al. | 395/800 |
| 5,298,894 | 3/1994 | Cerny et al. | 340/870.02 |
| 5,349,649 | 9/1994 | Iijima | 395/275 |
| 5,493,287 | 2/1996 | Bane | 340/825.52 |
| 5,495,239 | 2/1996 | Ouellette | 340/870.02 |
| 5,523,751 | 6/1996 | Byford et al. | 340/870.02 |

Primary Examiner—James P. Trammell
Assistant Examiner—Tony M. Cole
Attorney, Agent, or Firm—C. W. Alworth

[57] ABSTRACT

A utility usage data gathering system that is universally capable of operating with any other portion of another usage gathering system is disclosed. The system comprises of major portions, the universal transponder or actual device that accumulates utility usage and will universally relay accumulated usage to any reader/interrogator, and the universal reader that will universally read its own transponder or any other transponder. The system is based on standard micro-electronic chips and uses the same chips and logic in both the reader/interrogator and transponder. Each portion of the system, when polled by a foreign device, will determine what communication protocol is required and will respond to collect or transmit utility usage data in the proper protocol. Both portions of the apparatus use switchable multi-tapped antennae, capable of universal matching in order to transceive the modulated electromagnetic wave which contains the utility usage data.

17 Claims, 15 Drawing Sheets

S = SYNCH. DATA

SYNCH. METER RESPONSE:

PRO LINK RESPONSE:

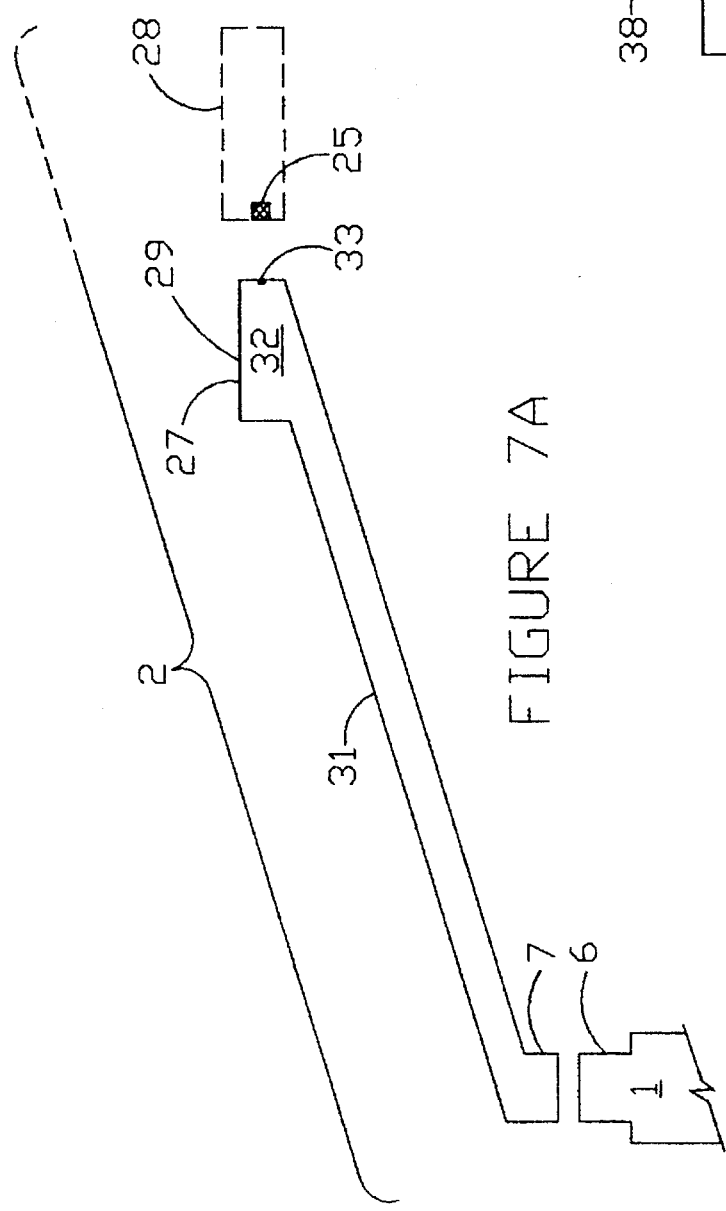
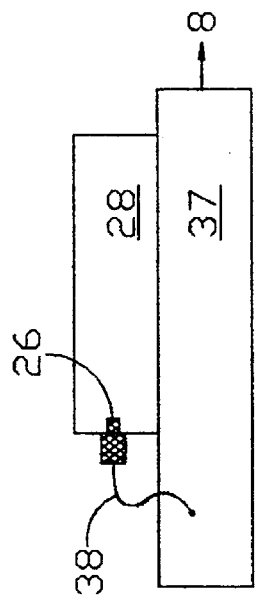
FIGURE 7A
FIGURE 7B

UNIVERSAL SEND/RECEIVE UTILITY USAGE DATA GATHERING SYSTEM

TECHNICAL FIELD OF THE INVENTION

The invention relates to an apparatus and method for metering, storing, transmitting, and recording consumption of a utility; in particular to an apparatus and method that can respond and transmit an emulated usage data signal to readers manufactured by other vendors or universally decipher a signal transmitted by utility usage transponders manufactured by other vendors.

BACKGROUND OF THE INVENTION

The current evolution in electronic devices has made it possible to manufacture utility usage metering systems that store and transmit customer utility usage to a hand-held reader or to a remote data gathering system. These systems generally consist of a some form of mechanical register which meters the actual utility usage coupled to an electronic transponder or a combination electronic register and transponder that sends the utility usage data contained within the register to a reader or remote data gathering system. Utility companies that supply gas, water and electricity have been using a combination of hand-held readers (carried from point to point by a meter-reader), transportable readers (carried in a truck and using radio frequency signals) and remote data gathering systems (transmitted over telephone lines or the like) to record utility usage by commercial customers.

A myriad of manufactures currently produce these utility metering systems with no regard to a standardized usage signal. For example, in the area of water meters, there are two major suppliers mechanical meters and associated electronic transponders and approximately four minor suppliers of mechanical meters which use one of three types of combination electronic register and transponder manufactured by independent minor suppliers. This means that there are at least five different electronic signals, or protocols, which indicate water utility usage none of which are compatible with each other. In reality there are more non-compatible systems, if one includes foreign manufactures and other small domestic manufactures. Looking at the utility metering industry as a whole, one must include electricity and gas meters. These metering systems also have their own data communication protocol.

The problem with non-compatible protocols becomes most acute in water utilities because most of these utility systems are owned by local governments. Thus, once a utility system decides to go to an electronic metering system, that utility system is restricted to a single supplier. Governmental entities do not like to be restricted to a single supplier as improprieties could exist or be suspected by local citizens. For a private utility system, such as a "publicly or privately" held electric or gas company, the single supplier syndrome is not present; however, it would be better for the utility company to have a choice of meter/transponder/reader systems.

Finally, with the age of the "information super highway" incompatible protocols will make the procedure of linking utility usage systems almost impossible. One simple answer would be for the industry, as a whole to devise an industry wide standard similar to the American Standard for Computer Information Interchange (ASCII) used by the computer industry. This will probably happen in the near future, but the cost of retrofitting existing utility usage meters and transponders with compatible transponders will be prohibitively high.

The utility supply industry is actively looking for an approach to "second source" suppliers of meter/transponder/reader systems. Metropolitan (city owned) water systems have demanded that the meter industry provide a means for alternate manufactures to supply devices that can be read or can read existing devices. Some cross licensing between major suppliers has occurred and the market is producing meter reader devices that will read another manufacturer's device; however, the market is not producing a device that will store utility usage and universally respond and transmit data to any manufacture's reader or remote data gathering system.

The instant invention provides a device that will gather water utility usage from a mechanical meter, respond, and transmit a protocol that can be universally read. The device can be installed with new meters or can be easily retrofitted to existing meters. The device therefore satisfies the "second source" requirement. Further, the device can readily be modified to operate in conjunction with any type of mechanically based utility usage meter such as used to meter oil, gas, electricity, steam, etc.

PRIOR ART

The prior must examined from two perspectives:

systems using a hand-held portable reader, and systems using remote data gathering.

Unfortunately, for the reasons given above, the hand-held systems have been extensively developed for water metering, and gas metering, and electricity metering with no regard to compatibility. The systems are essentially the same, for they are based around a mechanical meter which passes information to an electronic transponder, which then passes data to the hand-held unit. The remote data gathering systems (often referred to as automatic meter reading) have approached the art from a more general view point and consider different utilities.

Utility companies have long recognized the need for direct entry utility usage recordation rather than manually reading a meter, recording the usage, and then transferring the handwritten data to a central billing operation. The initial direct energy systems had a plug on the meter into which an opposite mating plug on a reader was inserted. The reader would then poll the meter, read the position of the mechanical dials and record this reading on paper, magnetic tape, or similar hard data recordation system. The reader was in turn polled at the central office and billing operations continued. The systems which used these mechanical plugs were unreliable because the meter plug would corrode. Systems were then developed to protect the plug but these continued to prove unsatisfactory.

An early effort to use well known electrical principals to eliminate the mechanical plug was disclosed in a 1979 patent to White (U.S. Pat. No. 4,132,981). White discloses a Self-Powered System for Measuring and Storing Consumption of [a] Utility Meter, which uses both mutual inductive coupling and optical coupling, to transfer an interrogation signal from and to send the mechanical position of dials within the utility usage meter to a hand-held reader. The interrogation signal, or wake-up call, is sent to the utility usage meter via magnetic or mutual inductive coupling. That is, the reader sends an electrical pulse to a reader head which is essentially a coil of wire. The electromagnetic effect causes a time varying electromagnetic field to exist in the general area of the reader coil. The reader head is positioned near a corresponding coil on the meter transponder which senses the electromagnetic field to produce a time varying electric current. This effect is better known as mutual inductive or magnetic coupling. This physical phenomena transfers the electric pulse from the reader head coil to the meter (transponder) coil. This wake-up pulse is of sufficient amplitude that considerable energy is transferred to the transponder. This energy, in the form of electric power, is stored within capacitors and provides power to the transponder. The transferred power allows the transponder to read the position of the mechanical dials and send a synchronized data signal back to the reader which reflects the meter reading.

At the time that White developed his invention, an optical link was chosen to transfer meter data back to the reader. White discloses, but never claims, that the same mutual inductive or magnetic coupling effect could be used to transfer the data signal; however, due to synchronization considerations, optical coupling was the preferred and claimed technique of transferring the data signal. White solved the problem of mechanical corrosion, but the White optical link would become dirty and data transfer could become unreliable.

U.S. Pat. No. 4,758,836 (Sciulli) discloses an Inductive Coupling System for the Bi-Directional Transmission of Digital Data and resolves the problems of White by using mutual inductive or magnetic coupling to transfer both the interrogation pulse and the resulting data signal. Sciulli, like White, uses the "wake-up" pulse to provide power to the transponder and takes advantage of the natural improvement of the electronic art to incorporate other features in the transponder, such as transferring transponder serial number and allowing for reprogramming of the data base within the transponder. The Bi-Directional effect is also used to properly synchronize the data transfer from the transponder to the reader. Again, Sciulli reads the mechanical position of the utility dials.

It should be noted that the inventions of Sciulli and White are assigned to one of the major domestic meter manufacturers. The other major domestic manufacturer of utility meters uses a similar system to transfer usage data and also transmits mechanical dial position. The data is transferred using synchronous transmission techniques. Both systems require a "wake-up" call which is used to energize the transponder. Neither of these systems uses internal (battery) power but relies completely on the power supplied by the interrogation or wake-up pulse. The cost of retrofitting this type of transponder is prohibitively high, because these systems read the mechanical registers in a utility usage meter and a brand new mechanical meter with the necessary read out devices must be used.

Most utility usage meters have a single pointer that is mechanically turned by the use of the utility (the pointer in a fluid meter or the revolving disk in an electric meter) which represents a given minimum use with each revolution. That pointer is turn coupled to mechanical dials which can be read manually. In the case of the two major suppliers of such equipment mentioned above, those mechanical dials are read electrically to give utility usage. The electronic art has progressed to the point that integrated circuit devices use very low power when they are in the quiescent or waiting state. Thus, it is possible to use electronic memory systems to store utility usage rather than mechanical dials by counting each turn of the pointer and storing that information. The electronic register system is readily adaptable to the retrofit market because the transponder need only "see" movement of the existing pointer.

U.S. Pat. No. 4,463,354 (Sears) and U.S. Pat. No. 5,111,407 (Galpern) are among the most recent patents to use electronic usage registers rather than mechanical usage registers. Both disclosures count passes of the pointer and store those counts in an electronic register. Whenever a reader interrogates the transponder, the device responds by sending the current "count" stored in the electronic registers. The reader device (or the office accounting system) knows how much utility usage a "count" represents and the "counts" are then converted into a utility reading. These disclosures use an internal long life (10 years or greater) battery in order to maintain the electronic registers and to be able to "see" the pointer at each turn. These electronic principals are well established in the art. It should be noted that the electronic register devices have yet to be applied to the retrofit market.

In a pure electronic storage transponder, if the battery fails movement of the pointer will NOT be detected and proper indication of utility usage will NOT be recorded in the electronic registers. This is probably the one reason that the two major suppliers of transponders have continued to use devices that read mechanical registers within their meter. If their electronic transponder fails to respond to an interrogation pulse, then utility usage may be manually read by physically looking at the mechanical dials.

These four prior art patents use mutual inductive or magnetic coupling in some manner or another to send an interrogation pulse to the transponder and/or to receive data from the transponder. There are major differences between the four patents. The two major suppliers of transponders (employing mechanical registers) use the initial (and continuing) interrogation pulse(s) to provide power to the transponder; whereas, the minor suppliers (employing electronic registers) must use internal battery power. Each transponder uses a different data transfer protocol and "wake-up" protocol. The two major suppliers of mechanical meter/transponders use synchronous data transmission which requires continuing interrogation pulses, while the minor suppliers of electronic meter/transponders use asynchronous data transmission which requires a single interrogation pulse and the necessary start bits. There are also differences between the two pure electronic register devices mentioned above but these are of minor consequence. Finally all of the suppliers of transponders use different center frequencies. Thus, there is no compatibility between the devices. It is possible to design a universal reader that causes each transponder to send data; however, one supplier's reader would not be able to interrogate another supplier's transponder, unless it were a universal reader. All of these transponders require that the reader coil and the transponder coil be in close proximity to each other (varying from physically touching to several inches apart).

U.S. Pat. No. 5,298,894 (Cerny et al.) discloses a Utility Meter Transponder/Antenna Assembly for Underground Installations. This device uses Radio Frequency signals for the interrogation pulse and for data transmission. The transponder is designed to operate in conjunction with a proprietary electronic meter manufactured by the supplier of the transponder. This particular transponder is a natural extension of the hand-held art in that it now allows the transponder to be interrogated by a hand-held unit at a distance up to 50 feet or by a truck mounted unit at a distance up to 150 feet. In many respects this transponder leans toward automatic meter reading without data lines in that a truck can be driven about the neighborhood polling and recording utility usage.

Remote data gathering systems, commonly called Supervisory Control And Data Acquisition (SCADA) are known in the metering industry as automatic meter reading (AMR) systems and like SCADA systems use data lines (be they telephone pairs, cable systems, optical networks, or the like). SCADA systems are well known in the art and the metering industry, has adapted well known and well practiced principals to AMR. U.S. Pat. No. 4,833,618 (Verma et al.) discloses a System for Automatically Reading Utility Meters from a Remote Location. Verma uses a remote data unit coupled to the meter (or meters) to be read which in turn is coupled to a telephone line. The central unit calls the remote unit which turn polls the meter (or meters), converts the data and transmits the data to a central office where is further converted and turned into a utility usage reading for providing billing information. Other prior art in AMR discloses a number of specialized pieces of equipment but again none of the prior art is concerned with compatibility as each disclosure uses its own protocol, its own specialized communication hardware, etc.

The major suppliers of mechanical meter/transponders manufacture, distribute and sell AMR systems and one supplier has obtained a license to use the other's data transmission protocol. The AMR system receives the "foreign" data from the foreign meter and converts that data into its own protocol. The foreign data, now no longer strange, is transmitted to the central office where it is read as if that data came from its own transponder. The major suppliers have recognized a need for data interchange but their solution is to employ external data converters rather than directly use the other's licensed protocol.

Thus there remains in the utility usage metering art a series of needs. Users of the equipment require a compatible "second source" transponder; that is, a transponder manufactured by a second supplier that is compatible with the first supplier's transponder. There remains a need for an electronic register transponder that can produce certain information about its internal operation whenever it is interrogated such as potential failure of batteries, electronic registers, etc. There remains a need for a transponder that can be readily retrofitted to existing mechanical metering systems. There remains a need for a transponder that can be directly used in an AMR system without the use of specialized protocol or equipment that is "transparent" to the central office billing operation. Transparency being defined to mean a compatible transponder device or AMR system that can be interrogated and transmit data using a presently installed system without any need for data conversion. And finally, there remains a need for a universal programmable reader that can read any supplier's transponder and output data in a given and particular supplier's emulated protocol; thus, making the universal reader transparent to the office billing operation.

SUMMARY OF THE INVENTION

The instant invention uses modern electronic techniques to form a combination electronic register and transponder which is capable of responding to almost any other manufacturer's interrogation pulse with a buried emulated protocol that tricks the other manufacturer's reader into thinking that it "sees" one of its own meters. The instant invention has its own specialized protocol which provides utility usage information, meter serial number, tamper flag, internal processor condition, battery condition (optional), leak flag, and other critical meter information to its own reader system. The device's protocol contains blank data transmissions; that is, empty time periods in which no information is passed by the device. It is possible to place an emulation of the other equipment manufacture's protocol which sends utility usage data only within these time periods. It is not necessarily possible to provide a universal protocol (that is, a protocol which can emulate all manufacturer's protocols within one data transmission) because signal timing periods would be exceeded and the information transmitted would be in error. The instant invention is specially programmed to send its own protocol plus one or more buried emulated protocols.

In order to be able to emulate almost any manufacturer's system, the instant invention uses two coils (or antennae) rather then the normal single coil used throughout the industry. One coil listens for the single interrogation pulse in the case of an asynchronous system or interrogation pulses in the case of a synchronous system. The second coil is used to send the utility usage information. In some cases the two coils are coupled together to provide antenna "gain". Thus, the device is capable of listening and talking (transmitting) at the same time which is crucial to its operation.

The combination transponder/register system operates in one of three normal modes, which includes a quiescent mode, and in a special program mode. The quiescent mode is the system's most normal mode and uses extremely low power. The quiescent mode monitors two trigger inputs:

the count switch—a switch or a set of switches that detects a single revolution of the usage pointer, and the detector coil or antenna—the input that determines if a reader is attempting to interrogate the transponder.

Within its quiescent mode, the device briefly wakes up every few seconds to update its internal clock in order to keep track of time. The time clock is used to determine certain operating parameters and system functions which are reported to the reader via the device's specialized communication protocol. (Note—only a special reader can decipher this specialized information.)

Whenever the count switch closes, indicating a minimum utility unit usage, the device responds to the resulting pulse by momentarily "waking-up", incrementing the electronic count register, saving the new value in a non-volatile secondary register and going back to sleep. The device uses two electronic registers, a primary register utilizing RAM and a secondary register utilizing EEPROM. These two registers should always indicate the same utility usage, if they do not, then an error has occurred within the electronic system. Utility usage is properly stored in the EEPROM register and is considered to be very accurate and if the registers disagree, the EEPROM value is used Whenever current is sensed on the detector coil or antenna; or, if the device is used in an Automatic Meter Reading (AMR) system which incorporates a Meter Interface Unit (MIU), whenever the interrogation command is received, the device wakes up and starts timing the length of the interrogation pulses. After a brief period of time in which the interrogation pulses are timed, the device compares the interrogation pulse times to an internal "look-up table" and decides what sort of reader or MIU system is interrogating the unit. The transponder responds to the interrogation signal based on synchronous or asynchronous communication.

If the interrogator is a synchronous system, then the transponder responds with either an asynchronous data stream whose starting period is synchronized with the interrogation pulse or a synchronous data stream depending on the reader/interrogator emulation. In the case of asynchronous response to a synchronous reader/interrogator, the total time period of the communication back to the interrogation unit is brief and no timing errors will be introduced. Even though the interrogator is attempting to clock the received signals, those signals are sent in such a manner that the interrogator does not notice that the signals are not being clocked and hence the interrogator is unaware of the discrepancy. It should be noted that if the communication took a long period of time the asynchronous form for an emulated synchronous signal would be seen as invalid by the interrogator.

If the interrogator is an asynchronous system, then the transponder responds with an asynchronous data stream whose starting period is synchronized with the start bits of the interrogation pulse.

It is important to realize that the transponder always responds with its own protocol and intermixes the emulated communication signal within the blank times of the transponder's specialized protocol. In the case of the synchronous emulation, the specialized protocol is sent during the time that the interrogator is sending a clock pulse, and in the case of the asynchronous interrogator the specialized protocol is sent during the time the interrogator is sending a request for data. The intermixed signals are transmitted over the second coil or antenna or to the MIU lines. In all cases the specialized protocol is identical and varies only in respect to baud rate. The response from the transponder is transmitted without regard to further inputs from the interrogator, only the initial pulse widths coming from the interrogator are measured and everything else is ignored. The specialized reader rejects the buried protocol and only accepts its specialized information.

The transponder (which contains the electronic counting and metering circuits) comes in several physical forms or embodiments. The device is available as a 'Pad Read' device only, in that interrogation of the transponder may only be accomplished by a reader/interrogator having transceiver coils or antennae; it is available as a MIU transponder only; and it is available as a combination 'Pad Read' and MIU transponder. The fundamental difference between the embodiments is a transponder with or without a "Read Pad" and the necessary program to allow the transponder to operate in the chosen mode. The first embodiment is for use by small utilities that probably will not use an AMR system. The second embodiment is for use by utilities that have an established AMR system and wish to second source. The third embodiment is for use by utilities that are switching from 'Pad Read' systems to AMR systems. The first embodiment can be converted to the second or third embodiments by a simple programming change and the addition of MIU or serial output lines. Similarly the second embodiment can be converted by a simple programming change and the addition of a 'Read Pad'. Finally, the third embodiment, although available with programming that would allow it to perform either of the function at the same time, is generally supplied with internal programming to perform one or the other function. This choice is made to save internal power.

Finally the combination transponder/register has a programming mode. This mode requires a physical connection. This requirement is deliberate and the physical connection is located within the unit which requires that the unit be opened. This method is unlike the present art, some of which allows for reprogramming through the data coils. If reprogramming of any electronic device is attempted through a communication link, then reprogramming of the communication protocol is not possible. In the instant device the communication protocol can be reprogrammed. Thus, the user can state that the transponder should respond to "A-protocol" and the transponder can then be programmed to produce the specialized protocol with "A-protocol" buried within the data stream. Suppose that the user then wishes to use "B-protocol". The transponder can then be reprogrammed to produce "B-protocol" within the blank times of the specialized protocol. This same programming mode is used to download or change the MIU or 'Read Pad' options explained in the preceding paragraph.

BRIEF DESCRIPTION OF THE DRAWINGS

FIG. 7A shows the reader/interrogator wand for interrogation of the transponder. The drawing further shows the Visual Display Unit and the Optional Data Link Recorder.

FIG. 7B shows the Data Link Recorder in a "cradle" for downloading utility usage information read by the reader/interrogator.

DESCRIPTION OF THE PREFERRED EMBODIMENT

Figure 1:
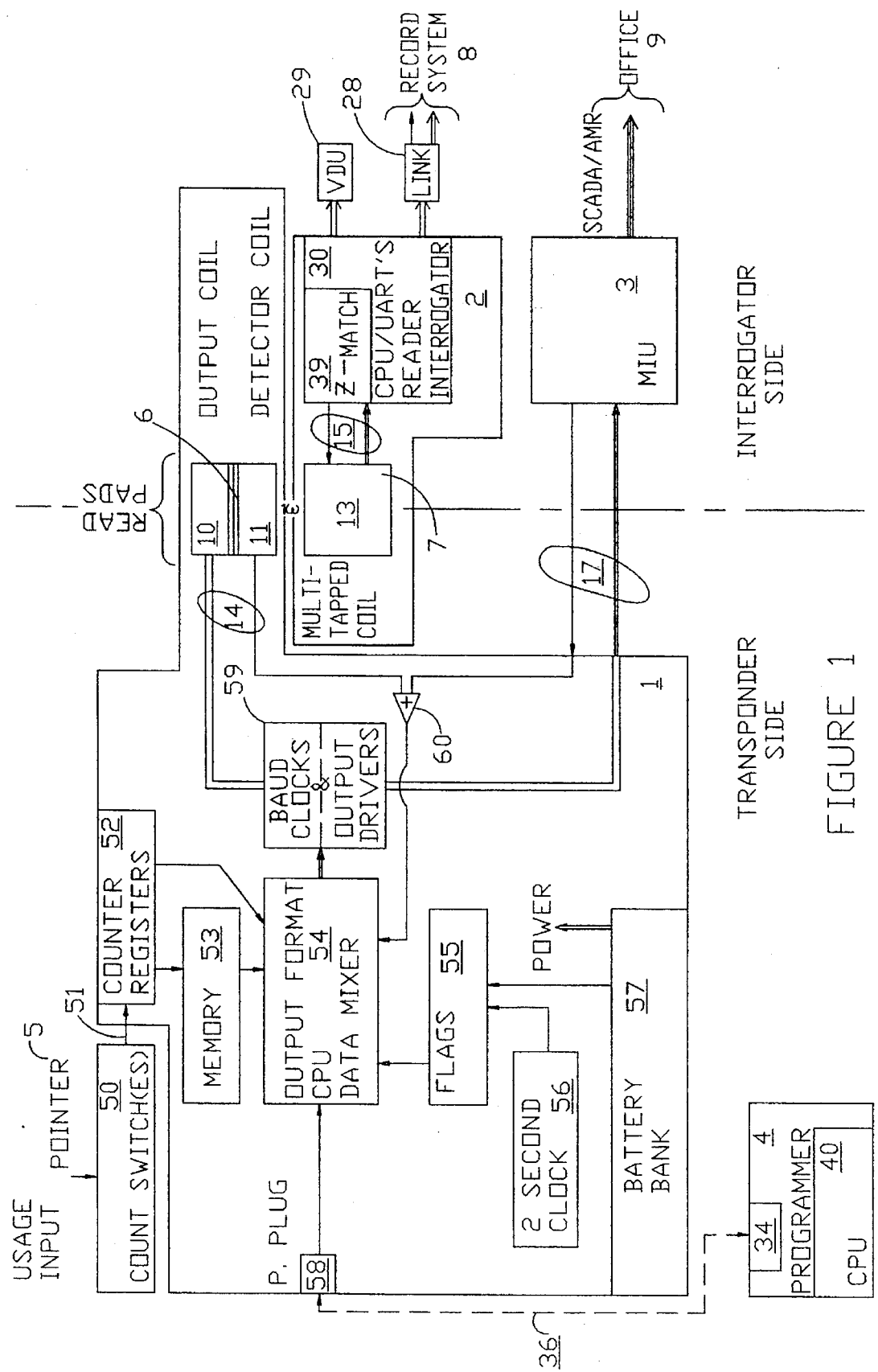
FIG. 1 is a block diagram of a Universal Send/Receive Utility Usage Data Gathering System as constructed in accordance with the present invention.

The Universal Send/Receive Utility Usage Data Gathering System is shown in block diagram form in FIG. 1. The universal transponder/electronic register is shown generally as item 1, the universal portable reader/interrogator is shown generally as item 2, and the Meter Interface Unit Reader/Interrogator, for connection to central data lines, is shown generally as item 3. As explained previously the Universal Send/Receive Utility Usage Data Gathering System has three general embodiments:

1) a 'Read Pad' device only, in that interrogation of the transponder may only be accomplished by a reader/interrogator having transceiver coils or antennae;

2) a MIU transponder only, in that interrogation of the transponder may only be accomplished by a reader/interrogator having direct wired data lines between the transponder and a MIU interface unit; and, 3) a combination 'Pad Read' and MIU transponder which combines embodiments 1 and 2.

The universal transponder/electronic register, which will be referred to as the transponder, remains fundamentally the same for all three embodiments. The transponder has four input/output functions.

The transponder first receives input information directly from a utility usage meter. In the case of a fluid (gas or liquid) meter, the transponder counts turns of the mechanical pointer which completes one revolution for a given number of gallons (or cubic feet) of water usage. In the case of an electric meter, the transponder counts turns of the spinning disk which completes one revolution for a given number of power units (Watts, Volt-Amperes, Volt-Amperes Reactive, etc.). FIG. 1 illustrates the system as used on a water meter wherein utility input information enters the system from the mechanical pointer, 5, on the water meter (not shown) via the count switch, 50, and associated data line, 51. The system is available with paired count switches arranged as an "Arm" and "Fire" pair, 50A and 50F (not shown in FIG. 1). The paired count switch option is used to resolve the problem of surging in utility usage meters where the pointer swings back and forth under a single count switch. This surging causes multiple counts and a corresponding false indication of utility usage. Although FIG. 1 illustrates the instant device used with a water meter, the same concepts apply with any utility metering system or for that matter with any type of metering system.

The transponder generally is interrogated through one of two input/output (I/O) ports. If the transponder is to be interrogated by a portable reader/interrogator, hereafter referred to as a portable reader, then the transponder read pad, 6, is utilized. If the transponder is to be interrogated by an Automatic Metering system, then the MIU data lines, 17, are utilized. The CPU is programmed to send the I/O data to one of the two ports depending on the embodiment chosen for the transponder.

Finally, the transponder can receive input/output information from the programming plug, 58, which extends from the transponder encapsulated electronic module. The programming plug is a direct connection plug which mates to a standard programming unit, 4 via an interface box, 34. The programming unit should only be used by qualified service personnel to change the internal programming of the transponder central computer unit, the communication protocol, the I/O options, and etcetera. These programming functions will be examined later.

Interrogation and reading of the transponder can be accomplished by two means; a portable reader, shown generally as item 2, or by an Automatic Metering system using a Meter Interface Unit, 3. In either case the interrogation and reading logic is the same; the only difference is the source of the interrogation and the repository of the usage data. The portable reader utilizes a reader read pad, 7, to interrogate the transponder via the transponder read pad, 6, and places the usage data in one of two repositories; a Visual Display Unit, 2A, which is to be read by the meter-reader and manually recorded, or via a Data Link, 2B, into a mechanical recording means, 8 (not shown), for later reading by a central accounting office. The MIU system communicates directly with the transponder via the data lines, 17, and sends the usage data directly back to a mechanical recording means, 9 (not shown), located in the central office for Automatic Metering.

Figure 2C:
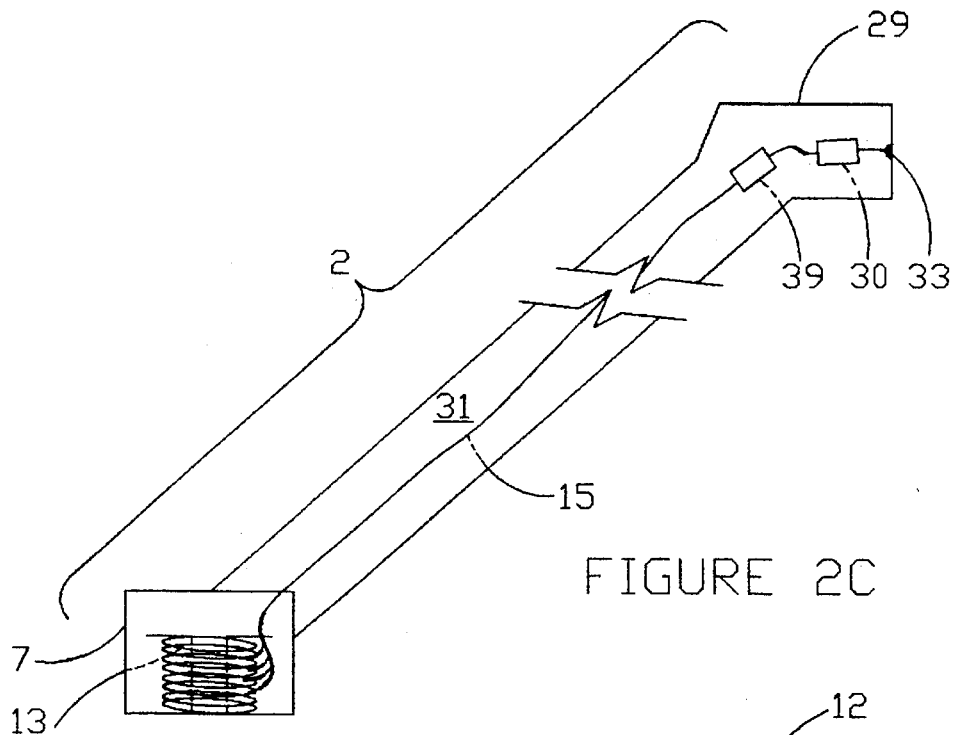
FIG. 2C shows the read pad of the associated interrogator and illustrates the layout of the read pad coils.
Figure 2B:
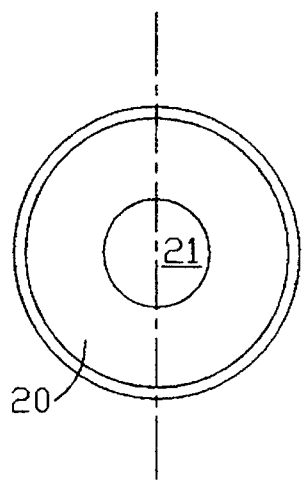
FIG. 2B is a top view of the container.
Figure 2A:
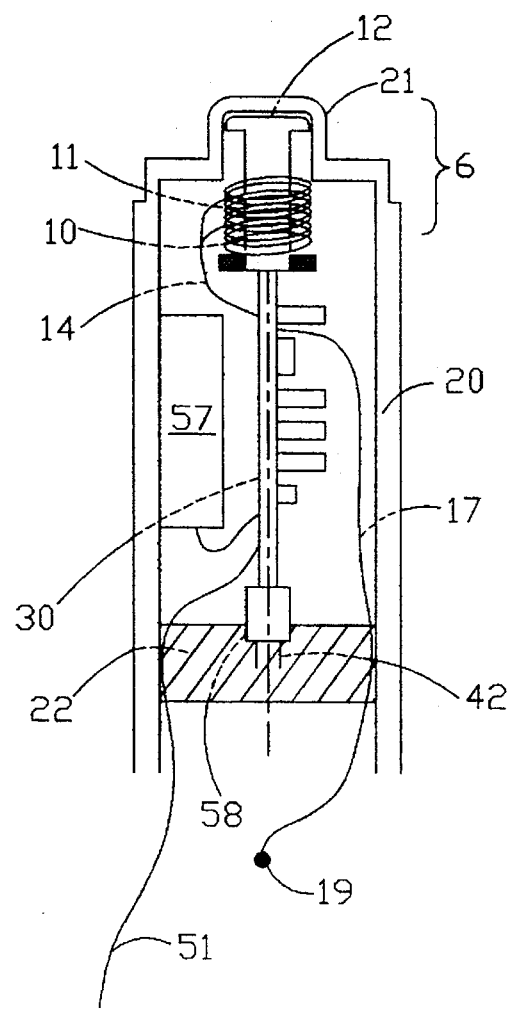
FIG. 2A is a cross-sectional view of the container which illustrates the construction and layout of the plurality of coils, the electronic module, battery and other associated components forming the transponder portion of the instant invention.
Figure 6:
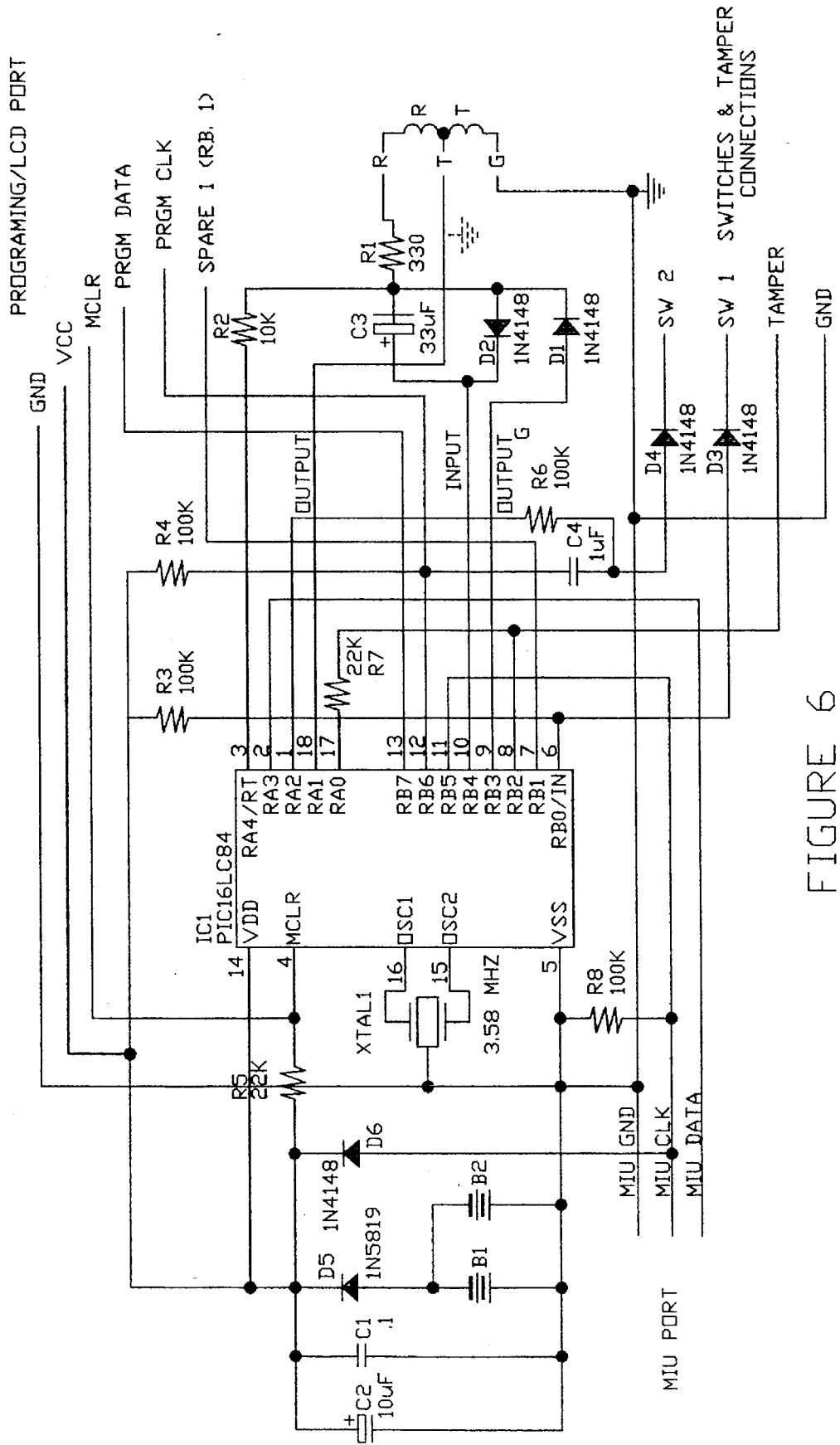
FIG. 6 is an electrical schematic of the transponder portion of the instant invention.

The transponder portion of the Universal Send/Receive Utility Usage Data Gathering System, as shown in FIG. 1, comprises of two physical parts: a encapsulated electronic module contained within an outer plastic container which holds a circuit board plus other associated components, and, if used, the transponder output loop and wake-up loop; and a cable which connects to a single counter switch or a paired counter switch. The physical device is illustrated in FIG. 2A. The circuit board contains all the logic circuits for the transponder. These logic circuits can be individual integrated circuits and associated electronic components or a custom Large Scale Integrated Circuit (LSI). The preferred embodiment for the electronic logic uses a standard low power chip, such as the PIC16LC84, plus additional discrete components as shown in FIG. 6.

The circuit board contains connection ports for the pointer input, 5 and 50; the read pad, 6; the MIU data lines, 17; and the program plug, 58. Included as a part of the electronic module is a long life battery bank, 57, (two cells) which provides base power for all the logic circuits within the electronic module and in particular for the count switch, 51; the RAM and EEPROM based electronic registers, 52; and the 2 second clock, 56. The battery provides power to the CPU, 54; the flags, 55; the output drivers, 59; and other associated electronic circuits on an "as needed" basis. The power approach will become more evident as the electronic design of the transponder is explained.

Referring now to FIG. 2A, the circuit board and its associated electronic circuits are "encapsulated", within a plastic container, 20, to protect the board and the electronics from the environment. Wires are connected to the I/O ports and the battery power port on the circuit board before encapsulating and are brought outside the encapsulated electronic module for connection to the "outside world". The read pad coils, 10 and 11, are placed at the closed end of the container with the circuit board on top and the battery, 57, (or batteries) placed to one side as shown. The programming plug, 58, is positioned on top of the circuit board at the open end of the container. Standard encapsulating compound is injected into the container so that the container is almost full of the compound. The programming plug extends above the surface of the compound so that electrical connection may be made to the pins, 42, of the plug; however, sufficient plug body remains within the encapsulating compound to firmly restrain the programming plug. The usage input cable, 51, extends outside of the encapsulating compound for connection to the input count switch, 50. If the Automatic Meter Reading (AMR) option is made available, then the MIU data cable, 17, also extends outside the encapsulating compound. The unterminated end, 19 of the MIU data cable is insulated and terminated.

Figure 2F:
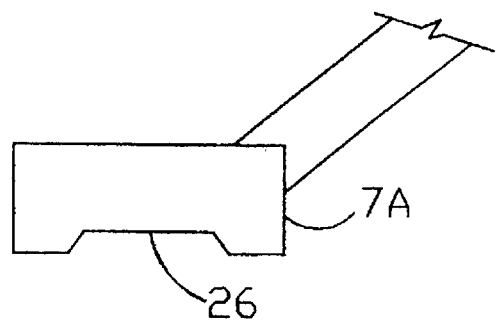
FIG. 2F shows the Neptune® reader.
Figure 2D:
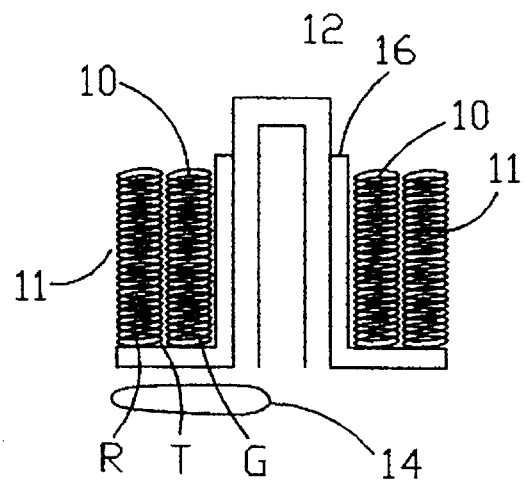
FIG. 2D is an enlargement of the read pad coils showing how the loops are formed on a plastic loop form.
Figure 2E:
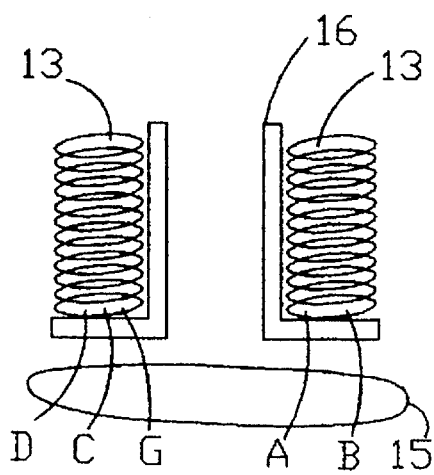
FIG. 2E shows an alternate reader/interrogator pad which incorporates a guide port as used on certain commercially available reader/interrogators.
Figure 3A:
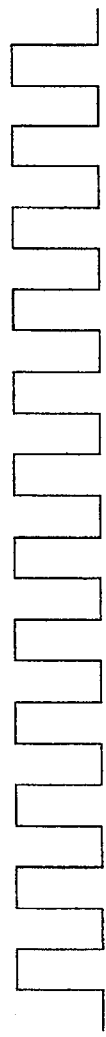
FIG. 3A depicts synchronous interrogation pulses as found in a mechanical meter/transponder system.
Figure 3B:
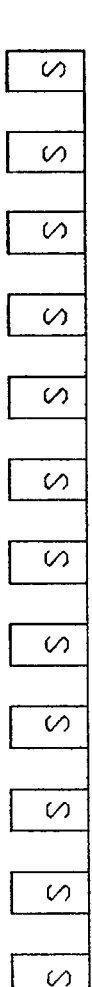
FIG. 3B depicts synchronous response pulses as found in a mechanical meter/transponder system.
Figure 3C:
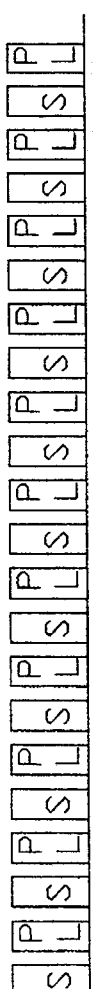
FIG. 3C depicts asynchronous response pulses as found in the present invention to the synchronous interrogation pulses of FIGS. 3A and B.
Figure 4A:
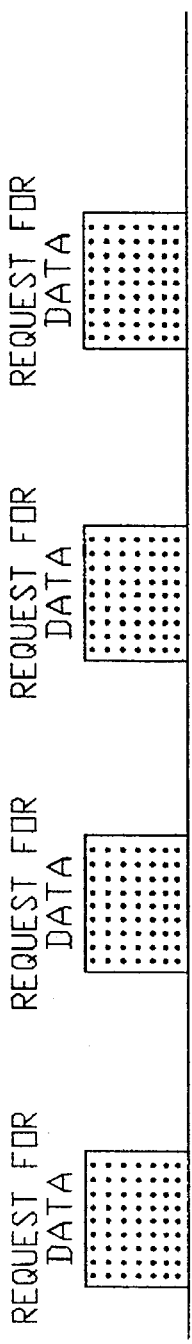
FIG. 4A depicts asynchronous interrogation pulses as found in an electronic meter/transponder system.
Figure 4B:
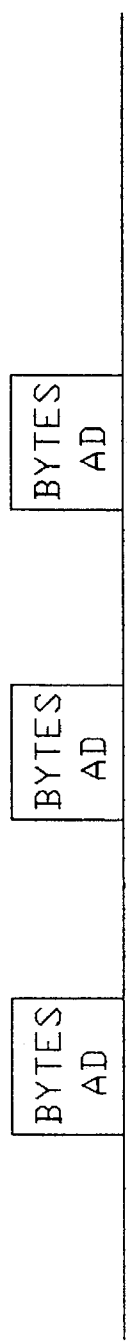
FIG. 4B depicts asynchronous response pulses as found in an electronic meter/transponder system.
Figure 4C:
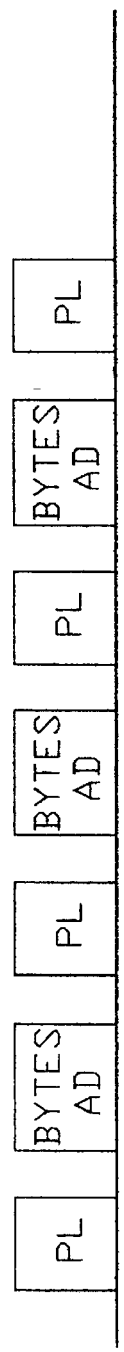
FIG. 4C depicts asynchronous response pulses as found in the present invention to the asynchronous interrogation pulses of FIGS. 4A and B.

The transponder read pad, 6, consists of a multiple-tapped winding which serves as the output coil, 10, and as the detector coil, 11. FIG. 2A shows both the transponder read pad, 6, and the reader/interrogator read pad, 7. The transponder antenna system actually comprises of a multiple-tapped winding which forms the two loop antennae of between approximately 600 and 900 turns of #31 wire formed on a plastic loop form, 16. The actual layout of the winding is shown in FIG. 2D. A ferrite core, 12, is inserted within the plastic loop form. The ferrite loop serves to concentrate the electromagnetic field produced in the coil during transmission of data and to aid in producing the single side-band field required by one of the foreign readers manufactured by a major supplier of such equipment under the tradename of Neptune®. If emulation of this particular supplier is not required, then the ferrite core can be left out of the assembly. A manufacturing choice would be to produce the unit with the ferrite core because the requirements of the end user are not known. The ferrite core does not, as stated in the Sears patent, increase the separation distance between transponder and reader/interrogator coils. The core serves to facilitate the transmission of a single side band wave required reader/interrogators supplied by Neptune®. The reader/interrogator antenna is a completely different from the transponder antennae in that it comprises of a multiple-tapped winding, 13, of approximately 900 turns of #31 wire and does not require a ferrite core. The reader/interrogator loop is shown in FIG. 2E and has a minimum of four linked loops.

The choice of the number of turns to use in the two antennae is made difficult because of the universal aspect of the transponder and interrogator. In other words, the transponder antennae must closely match the foreign reader and the interrogator must closely match the foreign transponder. In dealing with a match between the instant transponder and its own brand of interrogator the choice of turns is relatively straightforward and about 600 turns on both antennae will match and allow the electromagnetic E-field and H-field components to transfer from one antenna to the other. If one were dealing with ones own transponder/reader and one other foreign transponder or reader, then the number turns would still be about the same.

The reader has essentially infinite power (a re-chargeable battery bank) and switchable gain (to be explained later) which means that the choice of number of turns for the universal reader/interrogator antenna is not critical. In fact the programmed gain circuits will allow the universal reader to read almost any foreign transponder because antenna matching can be programmed into the universal reader logic. The logic program would then select the appropriate gain and circuits so that synthetic loop matching would occur as necessary.

The loop antenna turn problem is compounded by making the instant transponder readable by any (within reason) foreign reader/interrogator. The choice of turns in the transponder must be made to match any (within reason) foreign reader. Programmable matching techniques may be used, but power is required to drive these matching synthesizer circuits. Large amounts of power is not available if long battery life is required. Thus, the manufacturer must make a choice as to which foreign readers (and how many) will be able to interrogate the universal transponder of this instant invention. Experiments have shown that a total 620 turns (310 for the Rx and 310 for the Tx sides of the antenna loop pair) of #31 wire will function for Neptune® and Sensus® emulations. It is known that as the ferrite core is changed in size or as the antenna form is varied in size then the number of turns must be changed. The best way to determine the required number of turns is by trial and error and the use of the Neptune® foreign reader to interrogate the instant transponder. The Neptune® interrogator is the most insensitive reader and, thus, the most sensitive to a variation in antenna turns. Experiments have also shown that a ferrite core of about ½-inches diameter, about ½-inches in length and with a hollow center of about 3/16-inches works best with the tested foreign reader/interrogators. It has also been found that the location of the ferrite core (required for Neptune® foreign interrogators) within the antenna loop is critical and that the best method to determine the proper location is by trial and error using a Neptune® type reader.

As explained above, the transponder loops are encapsulated within the end of the transponder plastic container, whereas the reader/interrogator read pad multiple-tapped loops are encapsulated within their own container and attached to a "wand", 31, which in turn is attached to the reader/interrogator unit. The transponder plastic container has a elongated tip, 21, which allows the ferrite core to extend up and into the tip as shown in FIG. 2A. The Neptune® reader, shown in FIG. 2F, has a corresponding indention, 26, which fits over the transponder tip. Other reader/interrogators do not use, nor require, the elongated tip or indention. (Certain Neptune® reader/interrogators include a recessed switch within the indentation. The switch is activated by the elongated tip and causes the Neptune® reader to poll the transponder.) The instant invention's form of reader/interrogator portion of the system and the action of foreign reader/interrogators will later be explained in detail.

The module container extends at least one-half inch past the encapsulating compound and will act to hold an elastomer cap or cover, 22, in place over the ends of the programming plug by friction between the wall and the cover. The elastomer cover is solely to protect the connection pins, 42, of the programming plug (or port) from the elements. The programming pins are properly plated but it is best to keep these pins as clean as possible so that the service technician may service the module if and when the need arises. The elastomer is easily penetrated by the pins and forms a separate seal about each pin. When the elastomer is removed the pins are exposed and the small openings into, but not through, the elastomer close back up on their own accord. After the technician is through, the cover is replaced, the pins penetrate the elastomer, and the elastomer once more seals those individual pins. Alternatively, the programming plug can be replaced with a connector that incorporates a plastic shroud (not shown) which closes over the pins to protect those pins. The art in pin protection is constantly changing and any technique that may be used to protect these programming pins is within the scope intended.

Figure 5B:
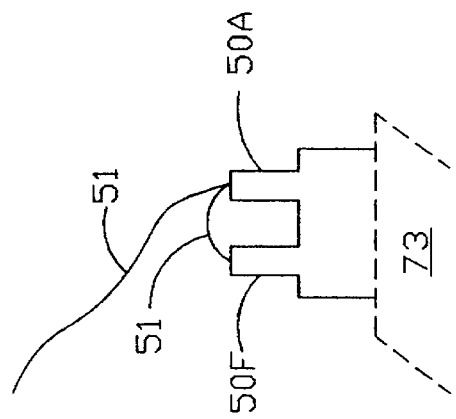
FIG. 5B shows the preferred embodiment for a dual count switch on the meter.
Figure 5A:
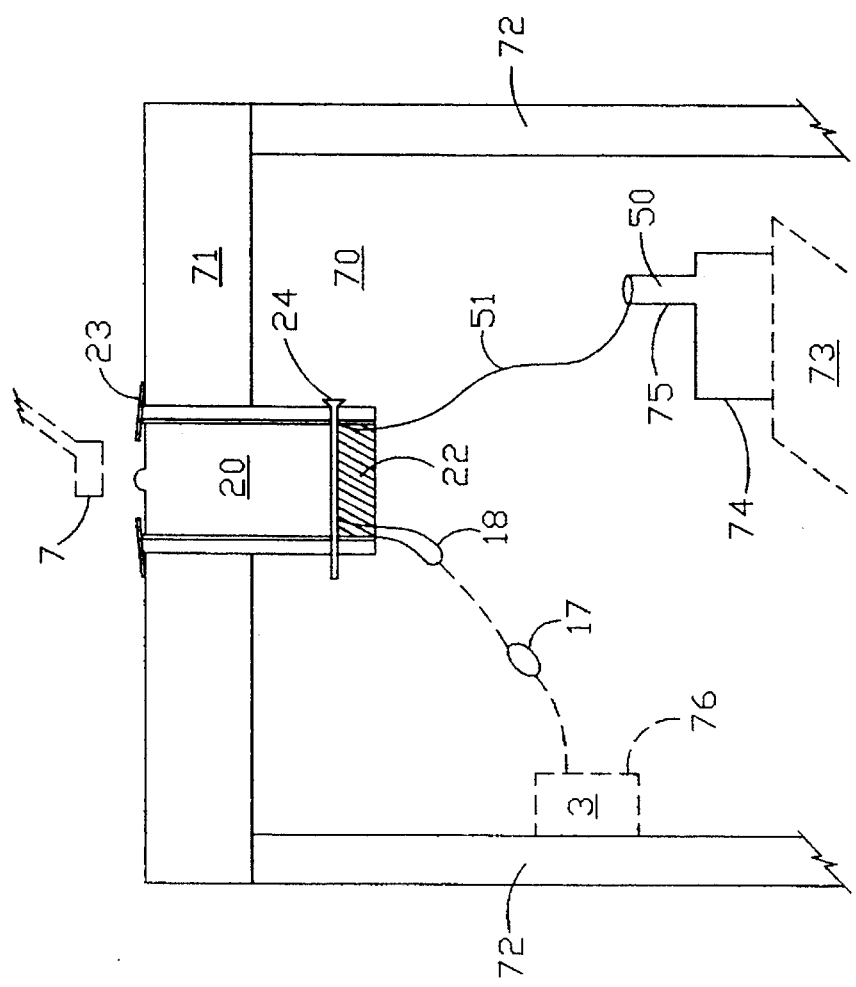
FIG. 5A shows a water meter installation using the instant invention and incorporating a single count switch on the meter.

FIG. 5A shows the actual installation of the Universal Send/Receive Utility Usage Data Gathering System installed in a standard water meter vault, 70. The standard water vault has side, 72, and a removable lid 71. Industry standards now require an opening in the vault lid (supplied with a removable plug—not shown) in which a standard sized vault cylinder, 23, may be placed. In most water meter installations the vault cylinder holds and protects the read pad coils associated with a transponder at the surface of the meter vault for ready reading by a reader pad (shown as dotted lines item 7). The present device, 20, is small enough to fit within the vault cylinder along with its associated read pad. The pointer switch input cable, 51, is routed to its associated count switch, 50, which is contained within a copula, 75, on the meter lens, 74. (The specially designed meter lens and single copula are the subject of related U.S. patent application Ser. Nos. 29/022,552 and 29/022,561.)

There are two versions for the count switch circuit which are physically and logically different. The first version (as shown in FIG. 5A) uses a single count switch and associated copula on the lens. This single count switch is subject to "surging"; that is, water pressure pulses can occur in a water system which will cause the usage pointer to vacillate back and forth. This vacillation can sometimes occur when the pointer is located immediately under the count switch and will cause false counts (or usage indication). The alternate and preferred embodiment of the instant invention, shown in FIG. 5B, uses two count switches separately located in their own copula. The pointer passes under one count switch, 50A, and "arms" the logic. The pointer then continues its sweep and passes under the second count switch, 50F, and "fires" the logic. The arm and fire ensure that a proper usage count is taken. Experience has shown that it is best to separate the arm and fire switches by 180 degrees: manufacture of the lens cap is also facilitated by this choice. The angle of separation need only be sufficient to ensure that vacillation of the pointer will not arm and fire the logic.

The electronic module container, 20, is slipped into the vault cylinder and retrained by a pin, 24, which passes through openings (not shown) in the vault cylinder. If required and if the proper option is available within the transponder, the MIU termination, 19, may be opened and the MIU, 3, spliced into the MIU Data cable, 17; otherwise, the termination is left alone. Communication leads, 76, from the MIU are connected to the central office via data lines. The transponder may then be interrogated by whatever option the user desires. Physical installation of the instant invention in electric, gas, or other metering situations would be similar, although a vault cylinder may not be necessary.

Figure 7D:
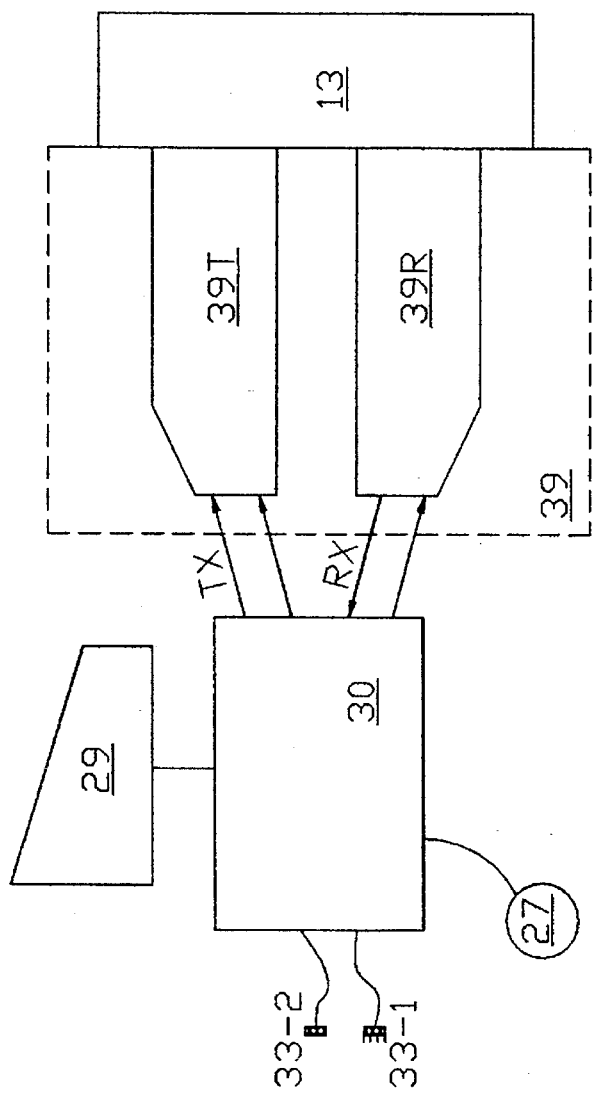
FIG. 7D is a block diagram of the reader/interrogator showing the CPU, the Interface Module and the Tapped Loop Antenna.

Turning now to FIG. 7A and 7B, the universal reader/interrogator subsystem, which will be referred to as the reader will be examined in detail. The universal reader, 2, consists of three sections coupled together in a platform:

the reader read pad, 7, the wand, 31, and display housing, 32, which further contains
the reader logic, 30,
read pad driver/reader electronics, 39,
the display, 29, and
a communication ports, 33-1 and 33-2.

Figure 8A:
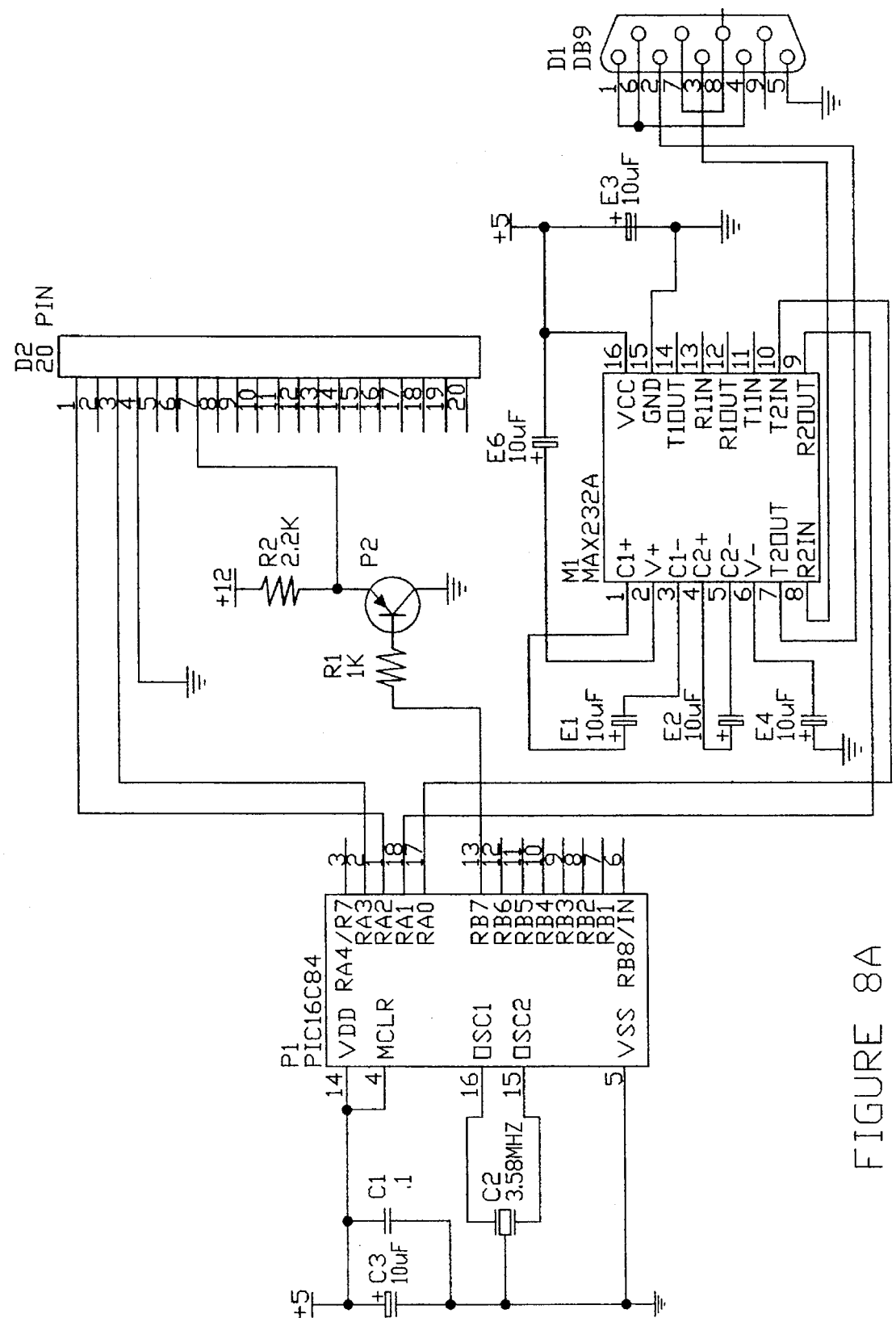
FIG. 8A is an electrical schematic of the interface module which converts a standard hand-held computer into a programmer for the instant invention.
Figure 8B:
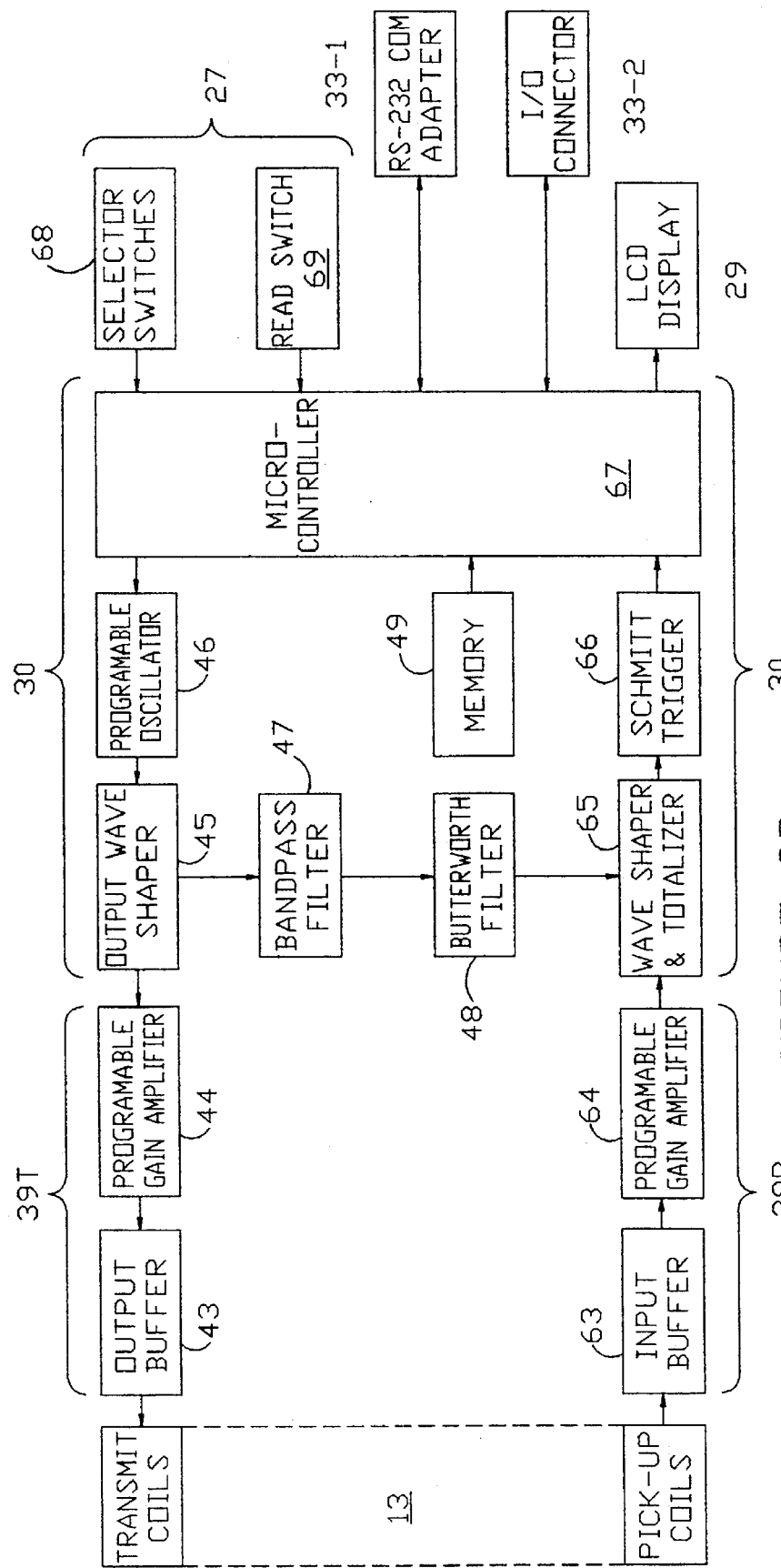
FIG. 8B is an electrical block diagram of the interface module which allows the reader/interrogator to transmit and receive data from the tapped interrogator loop antenna.

The wand may be a fixed length wand or be an adjustable telescoping wand and the communication port may use either the 25-pin or the 9-pin RS 232C wired link or the LED link. In its usual embodiment the communication port is supplied with the 9-pin RS 232C link, with the LED link being a manufacturer's option. The 9-pin RS 232C is used because a simple plug to plug converter may readily be obtained to adapt the 9-pin port to a 25-pin port and the communication is a well known standard. (Two ports one using RS-232C and the other LED communications may also be provided.) The telescoping wand is preferred. As explained earlier, the read pad incorporates a multiple-tapped loop antenna, shown in detail in FIG. 2E. A schematic block diagram of the electronic circuit is shown in FIG. 8B.

The platform allows the meter reader to set the type (or manufacturer) of transponder to be interrogated and then to interrogate the chosen type of transponder by pressing a key after the read pad is placed near the transponder. Due to the high gain circuits used in platform it is not necessary to touch the transponder read pad, even if transponder happens to be of the Neptune® type. (Neptune® reader/transponder systems, as previously explained, use a particular form of FSK that requires the manufacturer's interrogator read pad to physically touch the transponder's read pad.

The internally stored program within the logic system, 30, then emulates to the selected transponder's protocol and uses standard communication language to send signals out the "TX" line to the coil driver portion, 39T, of the reader interface module, 39. The same program listens for a response from the transponder on the "RX" line from the programmable amplifier portion, 39R, of the reader interface module, 39.

The reader interface module, 39, is tied directly to the multiple-tapped reader loop antenna, 13. The program selects which "taps" on the loop antenna will be used for the selected transponder emulation by sending information to the TX and RX logic in the interface module. The multiple-tapped loop antenna can and does function as both a receive and transmit antenna at the same time. For example, in emulating a synchronous data transmission, the TX circuit will drive the "A" and "B" lines on the loop with a continuous series of clock pulses which appear to look like the transponder's protocol. In the meantime the RX circuit will listen for a response from the transponder on "D" and "G" lines and combination of "C", "D", and "G" lines. In the case of an asynchronous transmission, the logic will send a series of pulses to the transponder and then wait for the reply. Here a number of choices as to how the multiple-tapped antenna will operate can be made. For example, "A" and "B" lines can serve as the transmit antenna and any combination of "C", "D", and "G" lines can serve as the receive antenna with the proper gain selected by the logic circuit. A discussion on the choice of number of turns for the reader antenna was held earlier.

Another series of options exist when communicating with transponders because the antenna is multiple-tapped and because the RX and TX circuits can be switched in and out by the logic circuit. As explained previously, a number of transponders require energy input to the transponder at the moment of reading or interrogation which is stored and then used to send the data back. This type of transponder requires a larger "wake-up" call then the instant invention. Thus, the logic controller is programmed to cause the TX circuit to select the full loop antenna of some 900 turns to send the wake up pulse. If the transponder replies with a weak signal, then the logic controller will set the RX circuit to its highest gain and use the entire antenna as a receive antenna.

The hardware for the universal reader/interrogator is shown in block diagram form in FIG. 8B. The central logic controller for the reader is chosen to be a micro logic chip from the PIC16C84 class. It is not necessary to use a low power chip because ample power is available from rechargeable batteries (not shown). A reasonable choice would be to use the same MicroChip as used in the transponder so that large order discounts would be available from the manufacturer and so that circuits layouts for both devices would be similar. The Central Processor Unit, 67, would be made up a plurality of MicroChips (two or more) in order to obtain the memory storage and calculation power required to operate the reader/interrogator. It is possible to purchase a single MicroChip, but large order discounts would not be available; plus, the manufacturer would have to maintain additional software/hardware to be able to communicate with a second MicroChip sub-system.

The CPU (a plurality of micro-chips) would be told what type of reader to emulate by the hardware selector switch, 68, or by an internally stored program in the optional DOS-based link driver, 28, to be explained in a later paragraph. The logic is then told when to read a transponder by a second hardware switch, 69, whenever the user has the reader in the proper position for transponder interrogation. (These two switch functions may be combined, but it is believed that the user would be confused and furthermore it has been discovered that meter-readers prefer a trigger type "read" switch.) The CPU is a capable of communicating via a 232 port or via an LED port. Depending on communication requirements, a UART 232 driver, 33-1, and/or a UART LED driver, and/or a straight "com" port, 33-2. may be added. The CPU need only be programmed to accept these drivers using standard procedures. As stated, the CPU contains sufficient memory, 49, to record up to 1000 transponder readings. (If additional readings are required, an external Data Link, 28, should be used, or the reader downloaded.) The CPU also directly drives an LCD display unit, 29.

The "read" trigger and the emulation selection drives a programmable oscillator, 46, to the proper frequency and rate in order to simulate the chosen emulated reader. The output from the oscillator passes through a wave shaping network, 45; through a programmable amplifier, 44, and output buffer, 43. The amplifier and buffer serve to select the correct number of turns on the reader antenna, 13, (see earlier discussion) as well as provide impedance matching. Part of the output wave is passed through a bandpass filter, 47, and a Butterworth filter, 48, and mixed with the return transponder signal in a wave shaper and totalizer circuit, 65.

The transponder output signal is picked up by the reader antenna, 13, and passed through the input buffer, 63. The buffer selects the correct number of turns and serves to provide impedance matching. The buffer output passes through another programmable gain amplifier, 64, and into the wave shaping and totalizer circuit, 65. The input and output waves are then shaped in a schmitt trigger circuit, 66, which restores the analog signals to a digital form for input back to the CPU for processing.

As stated, the logic controller, 30, also serves to store all data readings taken by the reader and drive the display, 29. The user may manually record the transponder reading from the LCD display or allow that reading to be automatically stored within the logic controller memory bank. At the end of the day, the stored data may be downloaded to a printer or to central office data collection and storage devices via the communication port, 33.

Power for the logic controller and the interface module is supplied by re-chargeable batteries; generally of the nickel-cadmium type. The location of the batteries and the charging plug are not shown in the figures as this type of technology is well understood in the art; however, the best location is within the display housing. Although the logic control circuits, the memory circuits and the interface module have been described as separate sub-circuits, all of these circuits may be mounted on one board and installed in the display housing.

The platform may be used with a DOS-based hand-held computer, 28, incorporating a corresponding communication port, 25, plugged into the communication port, 33. This option is shown as a series of dotted lines in FIG. 7A. The hand-held computer may be programmed to the route that a meter reader will follow. Thus, at the start of a route, the hand-held will know that the first meter-transponder is synchronous type S, and that the next several meters are the same. The hand-held will select the reader type and store data at each reading. The hand-held will known when to switch to synchronous type N, if such a meter is on the route or to any other type of meter. Downloading of stored data will be undertaken in the central office using a cradle, 37, as shown in FIG. 7B. The cradle is connected to the central office data collection and storage computers, 8. These same central storage computers can re-program the hand-held for the next day's route.

The universal reader/interrogator employs similar logic as does the universal transponder. The reader logic is shown in FIG. 12 and is relatively self explanatary. The reader is generally in a low power sleep mode. Two inputs will wake the reader up; pressing of the read trigger switch or a software command from the Data Link computer. The emulation protocol then follows. The protocol is set by the selector switch or by the Data Link computer. Once the protocol is set, the logic chooses the correct emulation logic (shown in FIG. 11, which is the same as the logic used by the Transponder and will be discussed with the Transponder); drives the programmable oscillator; sets the programmable amplifier gains (input and output); collects and stores the data from the transponder. The CPU logic would go onto to reformat the data and transmit it to the optional Data Link (if attached). The software protocol emulations 1 through 5 would function as Type N, Type S, Pro linK, and two other types of standard transponder protocols. These emulations may be set (or modified) at any time using standard computer programming and linking techniques.

Because the reader uses the same logic program as does the transponder, the reader is capable of polling a transponder and determining what type of transponder is responding to the wake-up call. Thus, another embodiment of the universal reader will not require the operator (or the hand-held) to tell the reader what sort of signal to expect. It has been observed that all transponders send a series of signals immediately following the wake-up call. Thus, all that is necessary is to use the same concepts employed by the transponder portion of the instant invention to determine the type of foreign transponder that is being polled by the universal reader portion of the instant invention.

Assume that the universal reader has just been turned on and that the meter-reader has reached the first transponder to be interrogated (or read). As previously explained, the "read button" would be pressed, and the interrogator would send a series of wake-up pulses to the transponder. The universal reader, when using the truly automatic selection mode, logically waits for the start portion of the transponder data stream, which is generally a series of clock pulses, temporarily stores (or holds) this stream, and compares this stream to the internal table. When a match is found, a 'protocol flag' is set indicating the type of protocol that is being received.

Now, allow that the transponder replies with a series of clock pulses of the Neptune® type. The universal reader would scroll through the internal table until it finds a match and would set the appropriate 'protocol flag'. It would then send a Neptune® type emulated protocol or, if a license had been obtained, it would send the Neptune® protocol. The universal reader would then store the next portion of the transponder response data stream, which contains the utility usage reading plus other information that the transponder would send.

The content of the stored return information would differ depending on the operating mode of the universal reader. If the universal reader is using emulated protocol, then the response data stream stored by the device would only contain utility usage and transponder serial number. On the other hand, if the universal reader is licensed, in this case by Neptune® then the device will store all data returned by the transponder which includes utility usage, serial number, and other Neptune® system information. The reasons for this difference in stored return data will be explained.

Once the transponder data has been stored, the universal reader would return to its quiescent state, and the meter reader would move to the next meter. At this time, the "read button" would be pressed, and the universal reader would start its interrogation of this particular transponder.

Figure 7C:
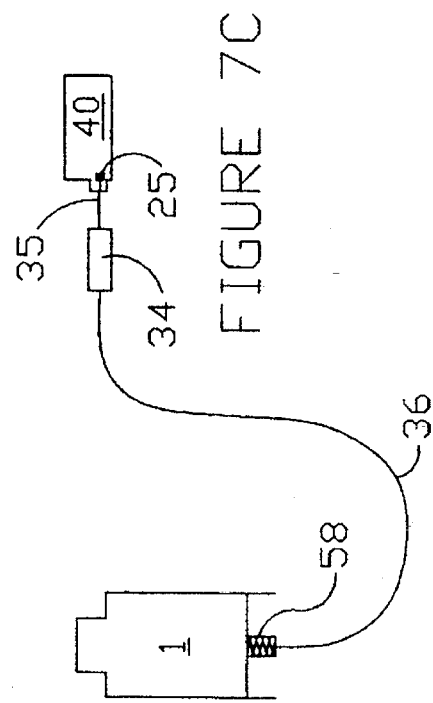
FIG. 7C shows a standard handheld computer in its programming mode employing an additional interface module.

The same hand-held DOS-based computer, used with the universal reader, can also serve as the programmer unit for the transponder, as shown in FIG. 7C. A special program can be loaded into the platform and the platform will then be able to download and upload information to the transponder using conventional computer techniques. A special Programming Mode Interface Module, 34, is plugged into the platform's RS 232C port using a data cable, 35. The module is then connected to the programming plug, 58, at the back of the transponder via a data cable, 36. The programming interface module contains a logic circuit, shown in FIG. 8A, and necessary batteries to allow the RS 232C 5-volt TFL level to function. The module will actually provide power to the transponder during re-programming.

Figure 10:
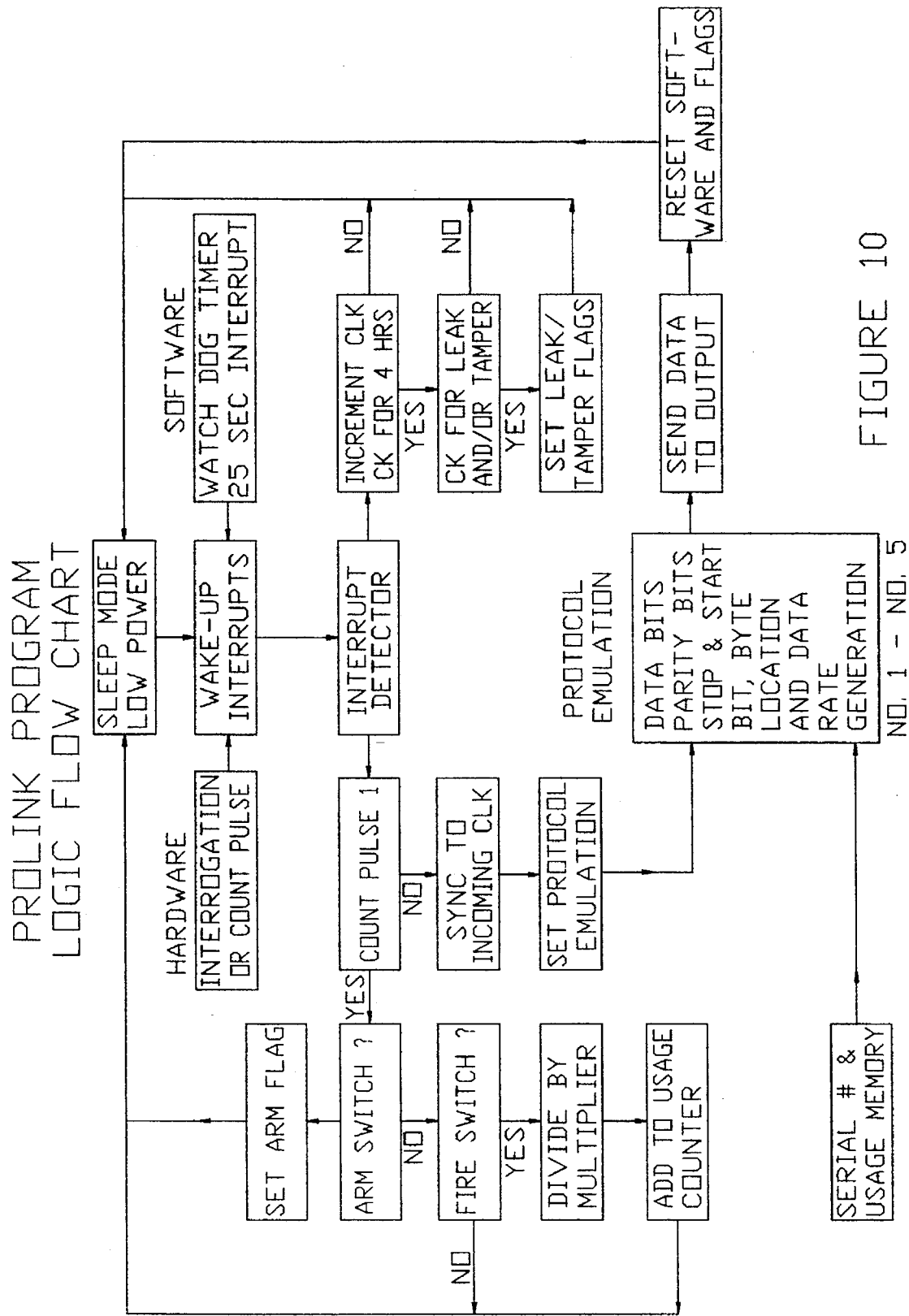
FIG. 10 is an operational flow diagram of the programmed Universal Send and/or Receive Utility Usage Transponder Data Operation in the present invention.

The programmer, 40, (which as stared is a general purpose hand-held DOS-based computer) can completely re-program the transponder. Thus, if a new vendor or better protocol enters the market, the transponder can be updated. The current state of the art allows for certain reprogramming but the Data Link is through the internal communication program(s) stored in the transponder. It is impossible to reprogram a computer's data communication protocol while using that protocol. Hence, the instant device chooses to use a separate programming plug located on the back of the transponder. (As previously stated the plug is protected from the elements by an elastomer cover.) Programming techniques are well established in the art and a qualified individual who understands the PIC16LC84 assembly language can program a DOS-based computer to transfer data to and from the transponder providing a logic flow diagram describing the required functions for the PIC16LC84 (or equivalent) controller is provided. (Such a diagram is shown in FIG. 10 which sets down the logic flow in order to emulate any foreign transponder's protocol.)

The programmer may directly interrogate the transponder and read and reset all internal RAM and EEPROM registers. This means that the transponder may be zeroed or if a replacement meter is needed, the transponder may be set a given preset value of usage units. The ability to so readily reprogram and/or reset the transponder requires security and the programming interface module provides that security. Only a qualified and trusted technician would be granted access to the modules and a renegade meter reader would not be able to reprogram or reset a transponder while on the route. Direct connection of the hand-held DOS-based computer/programmer to the transponder will not allow communication because the transponder operates at 3 volts and these logic levels will not properly register with RS 232C TTL protocol. This interaction will be examined with the functional description of the transponder.

The universal transponder, known under its tradename of "Pro linK" is the true heart of the instant invention and is designed to operate with any reader manufactured by any other (foreign) supplier of electronic meter transponders. The "Pro linK", as previously explained, will respond with its own protocol to its own reader as described above as a universal reader. In other words both the "Pro linK" transponder and its associated reader have the universal function. The "Pro linK" reader, known under its tradename of "OmniprobE", when used with a "Pro linK" transponder will glean much more information from the "Pro linK" transponder than will a foreign reader. A foreign reader will be able to obtain meter serial number and usage count from the "Pro linK". The "OnmiprobE" when used on the "Pro linK" will be able to obtain utility usage information, meter serial number, tamper flag, internal processor condition, battery condition (optional), leak flag, and other critical meter information as programmed into the "Pro linK" logic. on the other hand, the "OmniprobE" will generally only be able to obtain serial number and usage count from a foreign transponder. The limitation on the "OmniprobE" is caused by the emulation program. If a proper license were to be obtained from a foreign manufacturer, then the "OmniprobE" would be capable of a complete read of the foreign meter.

A proper license from a foreign manufacturer, as stated in the paragraph above, would no longer require the use of an emulation protocol for communicating with a particular transponder. This is because the foreign manufacturer would have granted permission to the user or manufacturer of the universal reader ("OmniprobE") complete access to the imbedded data stream required to interrogate and receive data from its particular transponder. When a manufacturer grants a "use license", the universal reader would simply be re-programmed, as previously explained, to use that particular manufacturer's protocol in place of the emulation protocol.

As explained in the summary of the invention, specialized information such as operating parameters and systems functions can only be transferred from a foreign transponder to a reader using the foreign device's specialized protocol; otherwise, because of signal timing problems, only usage data and serial number can be transferred using emulated protocol. Thus, a properly licensed universal reader would be able to obtain additional information from the foreign transponder.

If all or a majority of manufacturers would grant a "use license" for their own protocol to the user or manufacturer of the universal reader then the device would become a true 'umbrella' reader. From the perspective of the user an umbrella reader means the user is not bound to a single manufacturer for either a transponder or a reader/interrogator; hence, any implication of impropriety would be negated.

The physical layout of the universal transponder has already been described: the logic control, emulation routines and loop antennae concepts will now be examined in detailed. The electric circuit diagram for the transponder is shown in FIG. 6. The universal transponder is based on the low power PIC16LC84 controller chip manufactured by MicroChip Corporation. This chip contains all the logic functions, 1, shown in the block diagram of FIG. 1, with the exception of the programming plug and battery. Ancillary components are required to make the logic function, such as a crystal (for the clock), diodes, capacitors and resistors. The techniques required to layout, choose and design the fundamental micro-processor based transponder are well established in the industry and will be lightly explained as to the best embodiment. The instant invention may be found in assembly of the components, the use of dual loop antenna, and the method in which the components function.

The microprocessor based system draws its power from two long life 3.0 VDC batteries connected in parallel (battery bank, 57). The low logic can be sustained for roughly 14 years by these 3.0 VDC lithium based batteries based on calculations made on measured loads. (It should be apparent that this is a calculated average life that could be longer or shorter.) The battery bank is protected by a Schottky Diode D5 (1N5819) whenever the programming mode, which impresses 5.0 VDC on the system, is used. $V_{CC}$ is further protected by capacitors C2 and C1; C2 acting as a low frequency filter capacitor and C1 acting as a high frequency filter. It should also be noted that when the transponder is read by the MIU, TTL voltage levels are used and the Schottky Diode, D5, serves the same function. The Schottky Diode also blocks the battery bank when and if an external battery bank is added to the transponder; this option will be discussed later.

The MIU clock pulses are passed to the microprocessor and half-wave rectified by signal diode D6 (1N4148) and filtered by capacitors C1 and C2. This means that some power can be supplied to the logic circuit by the clock pulses—this concept is well known in the art as scavenging.

In a similar manner, the interrogator wake up call, can be used to scavenge power. In this particular instance, the wake up call (synchronous pulses from Type S and Type N readers or asynchronous start bits from Type A or Type B readers) is "seen" by the receive loop, R. These pulses pass through elements R1 and C3 and into the microprocessor at terminal RB3 where due to the internal structure of the microprocessor rectification occurs. Essentially all CMOS chips are produced with input limiting diodes tied to $V_{CC}$ and ground. If any over driving of an input occurs, the input is clamped to the ground (negative) or to the power buss (positive). The power buss is $V_{CC}$ which is tied to C1 and C2. Thus, the positive diode limiters on the logic act in a similar manner as does D6 and this rectification coupled with C1 and C2 allows for scavenging of power. (Note that although there is a 10K resistor, R2, between the R coil and logic input RA4/RT, some scavenging of power will occur at this input terminal. Again, sufficient power is scavenged so that very little power need be supplied by the battery to communicate to the reader.

The crystal oscillator circuit and watchdog timer circuit are incorporated within the standard logic circuits provided with the PIC16LC84, or similar MicroChip. The programming and use of these circuits requires one of ordinary skill in the art and the manufacturer's data hand book for the particular MicroChip. By design the MicroChip consumes very low power to count crystal oscillations leading to the 2.5 second wake up. Each watchdog wake-up call results in a clock accumulation leading to a 4 hour cycle at which time additional logic is performed. This particular logic is explained later.

The circuit and logic functions performed about the Receive and Transmit antennae are somewhat complex and depend on the reader/interrogator that is interrogating the transponder. The transponder antennae comprises a tapped loop of about 310 turns per tap, as discussed earlier. The antennae can function independently or as a combination again depending on the emulation required. In the listening mode, which is always occurring while the MicroChip is in its low power quiescent mode, the logic and the circuits are set to look at the Receive, R, Loop. Input pulses from the Receive Loop are coupled through R1 and C3 to input RB4 on the chip. The resistor/capacitor combination forms the common "tank" circuit to filter incoming pulse trains. The filter is required so that different types of reader/interrogator read-pulses appear to be the same to the chip. For example one type of reader produces pulses that are almost sine-wave in characteristic, while other readers produce a square wave. The tank circuit forms square waves into an "almost sine-wave" thus all inputs may be treated the same. (As explained above scavenging of the input pulse train for power also occurs at input RB4.) Input RB4 is the "wake-up" port in that whenever a pulse (or sinusoidal wave) appears at this input the chip wakes up and starts performing a series of preprogrammed logic functions.

Part of the signal appearing at the Receive Loop is coupled through a 10K resistor, R2, to input RA4/RT. The 10K resistor serves to stop any echo that may appear on the pulse(s) sent to input RA4/RT. This input serves to count the received (interrogation) pulses and make the determination as to the type of reader that is interrogating the transponder. The actual programmed logic will be explained later.

The transmit function is more complex and first the simplest form of synchronous transmission will be discussed. The type S reader/interrogator is looking for a synchronous data transmission that is correlated with its own clock pulses. (The content of the transmission will be examined in the programmed logic to be explained.) The type S reader requires a voltage to be developed at its own read pad coil and this can best be done by using the entire loop as the transmit antenna. Thus, with the type S reader communication output data is transmitted from port RB3 of the chip. (This particular logic can receive or transmit from any of its ports depending on the internal program.) The output data passes into the whole antenna via a blocking diode, D1, and into the antenna. Feedback of this output into the input port, RB4, is restricted by another blocking diode, D2. At same time, input port RA4/RT continues to monitor the receive loop for continuing interrogation pulses and synchronization of output data with those pulses. Thus, true duplex transmission is taking place. Type A and B asynchronous transmission is similar in that the whole coil is used for data transmission.

The type N reader/interrogator is probably the most complex form of data transmission. The type N reader requires close coupling of both reader and transponder read pads in order to transmit the single side band data stream. The type N reader transmits a continuous series of sine-wave clock pulses and looks at its own loop loading to determine if a data bit is present in the said band. In order to emulate this signal (which is the only signal that requires a ferrite core in the transponder loop) a load must be imposed on the reader loop by the transponder loop. The transponder receive loop continuously monitors the clock pulses coming from the type N reader and again full duplex data transmission is being accomplished.

The type N reader requires a side band shift (similar to FSK) to transmit a data bit which occurs every 16 clock pulses. To transmit a "0" the reader coil needs to be loaded which causes a shift in clock frequency. This shift is interpreted by the reader as a "0". On the other hand if no frequency shift occurs, then the reader interprets the 'non-shift' as a "1". Loading of the reader loop can readily be accomplished by shunting the T portion of the transponder loop. The T connection of the transponder loop is tied to input port RA1 which is normally allowed to "float" thus no current flows through this port. To shunt the T portion all that is required is for the chip to pull this particular port to ground. This decision is made by the logic portion in conjunction with the continuous clock pulses.

The transponder requires some form tamper detection which is simple. The four wire lead, 51, running from the transponder to the count switch or switches has one lead grounded to the transponder ground at the count switch on the meter lens cap (or in the case of an electric utility meter within the electric meter) and the other end tied to two ports on the MicroChip. An output port, RA0, is connected to an input port, RA8, via a 22K resistor: the same output/input port pair is connected to ground at the count switch. If the ground is present, which implies no tampering, then the input port will not go high whenever the output attempts to go high. On the other hand, if the ground is not present, which indicates an open lead or tampering, then the input port will go high and this condition will be seen by the transponder logic.

The counter switch or switches (preferred) are couple into the MicroChip via signal diodes D3 and D4. If a single counter switch is used, then the counter is coupled through D3 to input port RB0/IN. Bias for the counter is supplied by a 100K resistor, R3. When the pointer (or disk) passes under the switch the signal is grounded which causes the input port to drop and be registered by the chip as a count. The count also wakes up the chip which then process to follow its program.

In the preferred embodiment (preferred because the risk of surge counting is minimized) two inputs are required to be communicated to the MicroChip. The "arm" input is supplied to port RB0/IN as described above and serves to wake-up the logic. The logic then drives output port RA2 high which supplies bias to the "fire" switch via another 100K resistor, R6. When the pointer passes the fire counter switch, the bias is reduced to ground potential. This sharp lowering of the voltage produces a pulse which is coupled through a capacitor, C4, to another input port, RB6. This pulse is the usage count which is registered by the logic. The various assignments given to the input/output (I/O) ports of the MicroChip are for illustrative purposes only as any I/O assignment may be made with this type of chip. The logic programming need only be told what the assignment is and the computer chip will make any remaining decisions based on its own assembly language.

The remaining circuitry associated with the programming port is self explanatory. The MicroChip manufacturer's data sheet explains the connections and other requirements order to be able to download a program and/or operating system to the MicroChip. Connections to the programming unit (whose circuit has been discussed previously) are made through the terminals noted on the circuit schematic shown in FIG. 6. One function is not so obvious and that the use of the $V_{CC}$ input. As previously explained, the programmer supplies 5 VDC TTL levels to the MicroChip when it is being programmed. The lithium battery bank is protected by the Schottky diode, D5. This diode can serve another useful function if and when the battery bank is exhausted.

The lithium battery bank is sealed within the transponder module and cannot be replaced if it becomes exhausted after a period of time calculated to be in excess of 14 years. Weak internal batteries cause a slight problem in reading in that the transponder must be woken up several times in order to obtain a proper usage indication. The series of wake-up calls serves to store sufficient scavenged power which the transponder can use to communicate. (Alternately a low battery flag call be used to inform the central office a battery problem.) When the user notes that the transponder has a weak battery condition the user has two options:

1) replace the entire transponder, or 2) add an external sealed battery pack.

The external sealed battery pack is simply another pair of 3.0 VDC, type AA, lithium based batteries coupled in parallel. A pair of leads with a terminal that matches the programming plug, 58, is supplied with the external pack. The elastomer cover, 22, is removed and the battery pack plug inserted into the programming plug. Silicon grease is used to protect the exposed pins. The battery pack now supplies $V_{CC}$ to the power buss and the Schottky Diode serves to block current flow into the internal (exhausted) battery bank, 57. The transponder is now set for another 14 years of useful service.

The circuit logic is diagrammed in FIG. 10. The MicroChip logic remains in a "sleep mode" most of the time in order to conserve battery life. There are two types of "wake-up" that can occur which activates the complete MicroChip and causes data exchange to occur, with the corresponding use of power. The simplest of these wake-up calls is driven by the software watch dog timer which wakes the MicroChip up every 2.5 seconds to increment the internal clock and keep track of time. This time is used within the program to determine internal conditions related to leak detection and will be explained in detail. The other wake-up is hardware driven and comes from a number of input sources, these being:

(a) the count switch or switches, (b) the tamper connection, (c) the read pad, and/or (d) the MIU data lines.

Item (a) is the very usage that the transponder is designed to record and report. Item (b) is simply knowledge that someone or something attempted to tamper with the lead coming from the counter switches. Items (c) and (d) are associated with interrogation of the transponder. The various wake-up interrupts are passed to the interrupt detector where the logic decides if the interrupt was a count pulse (a), communication demand (c and d) or a software watch dog timer.

The software watchdog timer interrupts are the easiest to explain. Evenly 2.5 seconds the watchdog timer increments the timer, as a result a 4 hour clock is counted up. Every four hours the logic completes two operations:

1) checks for a leak, and 2) checks for a tamper.

Leak detection is simple; the logic looks at the counter register and if no usage has been recorded for the past 4 hours the leak flag is set low. If on the other hand, usage has occurred within the previous 4 hours the leak flag is set high. This process repeats itself evenly 4 hours. The reader/interrogator is programmed to look for the presence or absence of a leak flag and records that fact whenever the transponder is interrogated. The four hour period is software adjustable (via the programmer) to look for usage only at particular times of the day. For example, a given customer might not expect any usage between midnight and four o'clock in the morning; this time period would be programmed into the transponder.

In a similar manner tamper detection is simple. At each four hour period, the logic drives the tamper output port, RA0, high. If the tamper circuit is open, then the tamper flag is set high and will be "read" at the next interrogation of the transponder.

Other similar flags may be programmed into the logic. For example, a flag indicating that the logic controller has gone through a total reset is possible. Battery condition flags may be programmed. These decisions can be made at almost anytime during the life of the transponder because of the ease of reprogramming offered by the programming plug. Hardwired inputs (a), (c) or (d) are treated somewhat differently then the software watchdog inputs in that an external event will wake-up the logic.

The usage data can be handled in one of two ways. The first method (not completely shown in the logic diagram) involves the use of a single usage pulse. A single usage pulse is generated for each turn of the pointer (fluid meter) or spinning disk (electric meter). This single pulse is seen as the "fire switch" in FIG. 10. (There is no arm switch.) The single pulse wakes up the logic and is passed through a divide by multiplier and added to both the RAM and EEPROM usage counter registers. The logic compares the two registers to see that they are the same and if so the logic goes back to sleep. If the two registers are not the same, then the logic resets itself, sets the RAM counter equal to the EEPROM counter, and sets a problem flag. The problem flag tells the interrogator unit that the logic had to reset.

The second method for recording a usage count is shown in the logic diagram of FIG. 10 and is the preferred embodiment. The logic is straightforward in that the first count pulse comes into the arm port and wakes up the logic. The MicroChip first determines that it has been awaken by a count pulse. This decision is made by looking at the clock pulse input port, RA4/RT, to see if a series of pulses are entering the port, if not then the wake-up call was caused by a count pulse. The logic then sets the arm flag which supplies bias voltage to the fire counter switch as previously described. The logic then waits for the fire counter to close, counts the pulse, passes it through the divide by multiplier and adds the result to the usage counter registers in RAM and EEPROM. The logic checks to see if the two registers are the same and if so the logic circuit returns to its low power quiescent mode. If the registers are not same, reset and problem flag bits are as initiated as previously described.

Referring again to FIG. 10, the logic required to emulate the protocol of various and sundry reader/interrogators will be examined. As previously explained, a wake-up call received on any of the hardwired inputs is examined by the logic to determine what sort of call has been received by the transponder. If a series of clock pulses for synchronous reader/interrogators, or a series of start bits, is received on input port RA4/RT, then the logic knows that a reader/interrogator is polling the transponder. On the other hand, if a series of clock pulses is seen on input port RB5, then the logic knows that an MIU is polling the unit. Although not associated with the emulation logic, if a series of clock pulse appears on input port RB6, then the logic knows that a programmer is connected to the MicroChip.

Interrogation of the unit by a reader/interrogator or by an MIU results in the same internal logic being used to decide what protocol to emulate and which port to answer on. The choice of which port to answer on is set by which port receives the input series of clock pulses. Note, even an asynchronous start bit can be considered to be a series of clock pulses. The logic remembers where the clock pulses appeared and remembers where to reply; the only decision remaining is to type of response.

Type A asynchronous,

Type B asynchronous,

Type x asynchronous,

Type N synchronous,

Type S synchronous, or

Type y synchronous.

Note that "x" and "y" serve to indicate an unlimited (within reason) number of varieties of types of reader protocols or MIU protocols. Emulation of any protocol requires careful study of the results of the data transmission and trial and error in order to be able to emulate that protocol. Once an emulation has been found, simple and well known programming techniques may be used to program the MicroChip to recognize a given protocol and transmit an emulated data stream using the methods disclosed herein. Alternately licenses may be obtained from the manufacturer of the protocol and a true protocol may be transmitted to a reader/interrogator or MIU.

Once the logic has decided that the incoming pulse is a series of pulses which indicates that interrogation of the transponder is underway, the logic starts to count the pulses. If it "sees" a continuous stream of pulses, then the interrogation is synchronous. If it "sees" a burst of pulses, then the interrogation is asynchronous. The logic then determines the frequency of the clock pulse or burst of pulses which is used to determine the type of reader/interrogator that is polling the unit. Based on the frequency of the clock pulses, the logic then performs a table look and decides what is interrogating the transponder. The logic has available to it the meter serial number and usage count which it incorporates into its reply to the interrogator. Table look up techniques are well know in the programming art and may be readily undertaken by one skilled in the art.

Once the decision is made as to type of reader the logic must convert usage data and serial number to an understandable code for the interrogator (be it a pad reader/interrogator or an MIU). This can be done by using a simple repetitive program loop that converts the data into a serial bit stream with the necessary parity and check bit information. The techniques used to determine the program steps required to covert data into a serial bit steam with the necessary parity and bit check information are well established in the art and a person with reasonable skill in the art can readily make such a determination following the logic diagram of FIG. 11. The emulation protocol is used by both the transponder and the reader and will be explained in a later section.

FIG. 10 indicates that the afore described procedure is taken in the boxes labeled *Emulation Protocol No. 1–No. 5*. It should be noted that more then 5 emulations may be undertaken in the MicroChip; however, at the present time there are only 2 major protocols and several minor protocols used in the market place. Thus, FIG. 10 correctly indicates a reasonable number of emulations. Emulations 2 and 3 are used for the Type S and Type N synchronous reader/interrogators or MIU's; emulation 1 is used for the Pro link protocol, really a true protocol whose copyright is owned by the inventor and is readily available for licensed use; and emulations 4 and 5 are reserved for other minor emulated protocols. Emulations 4 and 5 may be programmed into the logic at any time (or changed) by use of the Programmer. The copyright to the emulation protocols is owned by the inventor and is readily available for licensed use.

Figure 11:
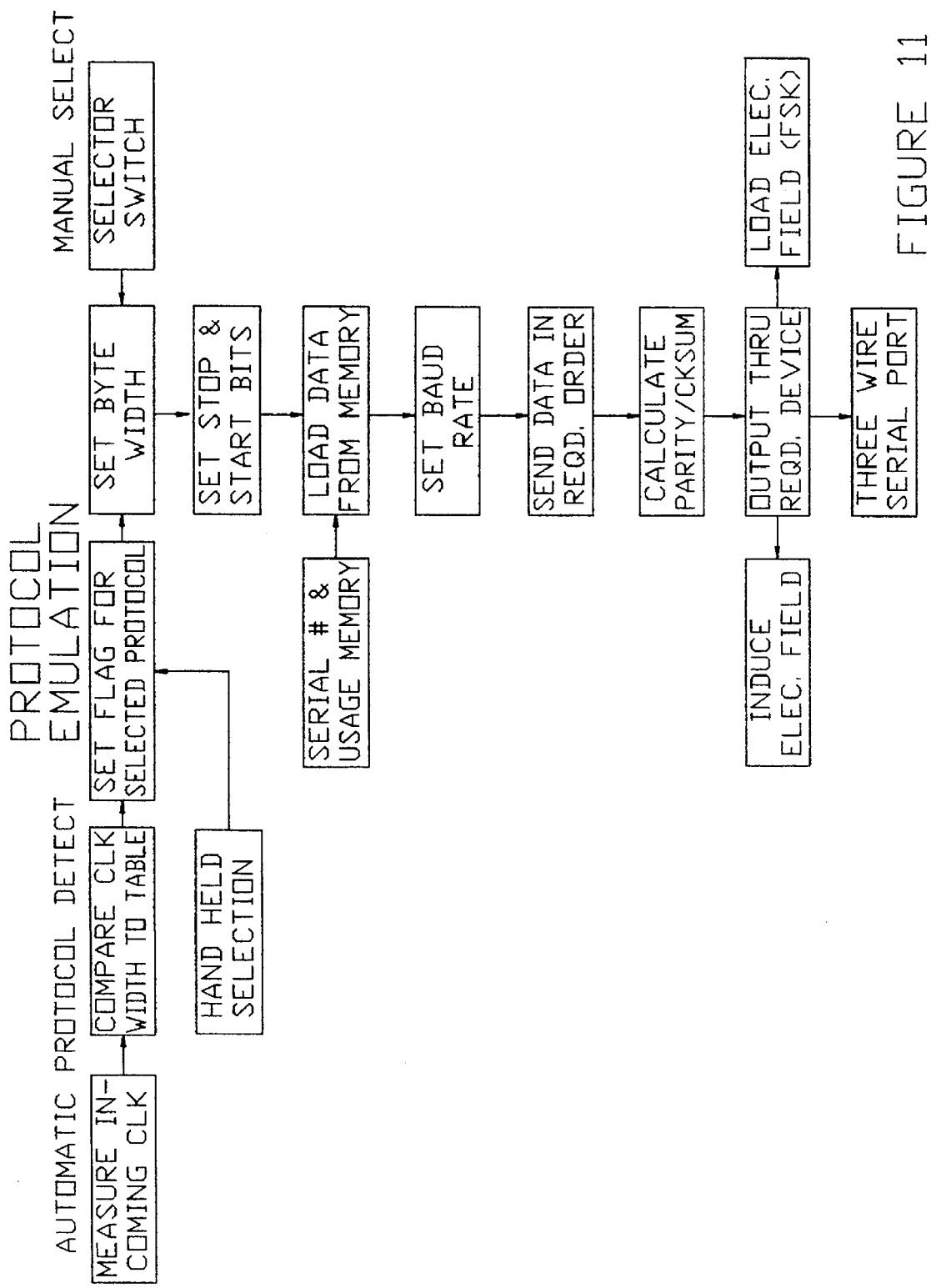
FIG. 11 is an operational flow diagram of the programmed Universal Send and/or Receive Protocol Emulation Data Operation as used by the Transponder and Reader in the present invention.
Figure 12:
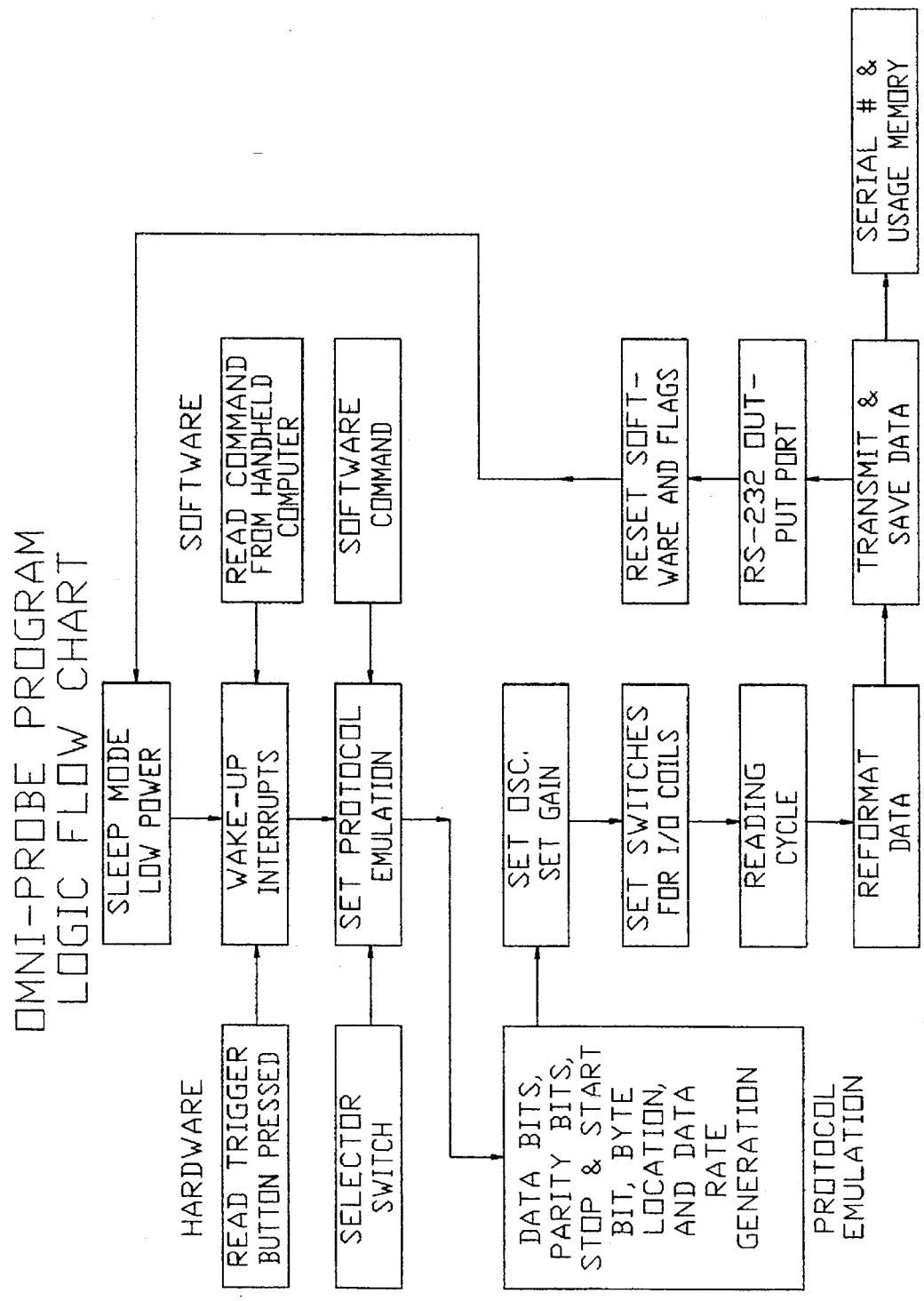
FIG. 12 is an operational flow diagram of the programmed Universal Send and/or Receive Utility Usage Reader Data Operation in the present invention.

FIG. 11 shows the logic flow diagram for the emulation protocol; with such a block diagram a person reasonably skilled in the art can program a Micro Logic chip to perform the protocol simulation. As stated earlier, if a software license has been obtain from a given manufacturer, then the exact protocol could be used instead of an emulation. The programming techniques would still be similar. FIG. 11 applies to both the transponder and the reader. For example, the logic would be set to look at hardware switches to decide on which protocol to emulate; these switches are intended to be only on certain embodiments of the reader. Thus, if there are no switches, there would be no input, and the logic would continue. (It is possible to manufacture the transponder with a "set" protocol using mechanical switches.)

In the truly automatic selection mode, as used in the transponder, the logic clocks the input pulses coming from the transponder receive antenna to set a protocol flag. The universal reader has the option of a truly automatic selection mode, and in this case the logic clocks the input pulses (synchronization or start words) being received by the reader antenna or the logic looks at the input coming from the optional reader hand-held computer to set the protocol flag. Again if one or the other input is not present it does not matter. The remainder of the data output operation is straightforward and is set once the type of data transmission is known using table look up. The logic knows if the data stream should go to a loop antenna or a three wire serial port by simple knowledge of the input data stream. Thus the final decision as to where to send the output is readily made.

The transponder logic employs a counting/timing logic operation to determine signal type. The reader, if using the automatic selection option, uses only the timing portion of the logic to determine signal type. For example, in the transponder, and referring to the schematic shown in FIG. 6, part of the received signal appears on MicroChip input RA4/RT. The RT input is a real time input and the MicroChip is designed to count whatever clock pulses show up at the terminal. When an interrupt occurs (see previous explanation) the MicroChip starts counting and timing, after a momentary time period the logic looks at the clock counter and makes a decision as to the type of signal based on the number of counts. A Neptune® reader clock pulse rate is lower then that of a Sensus® reader, whereas the asynchronous readers are much faster and differ among themselves. All that is necessary is to determine a reasonable and short time period and associated number of clock pulses. This can be done by experimentation. Simple look-up procedures are them followed. It should be noted that if the read interrupt is caused by an MIU, then the clock pulse rate seen at the real time terminal, RA4/RT, is zero. It is zero because no MIU pulses are directed to this terminal—the MIU clock enters terminal RB5. Thus, for an MIU read the clock rate determination technique will always show zero to the interrupt. Similarly the timing period/rate can be determined for the reader when it uses the universal option. Here the width of clock pulse (or pulses) coming from the transponder are timed and table look up techniques used.

Figure 9:
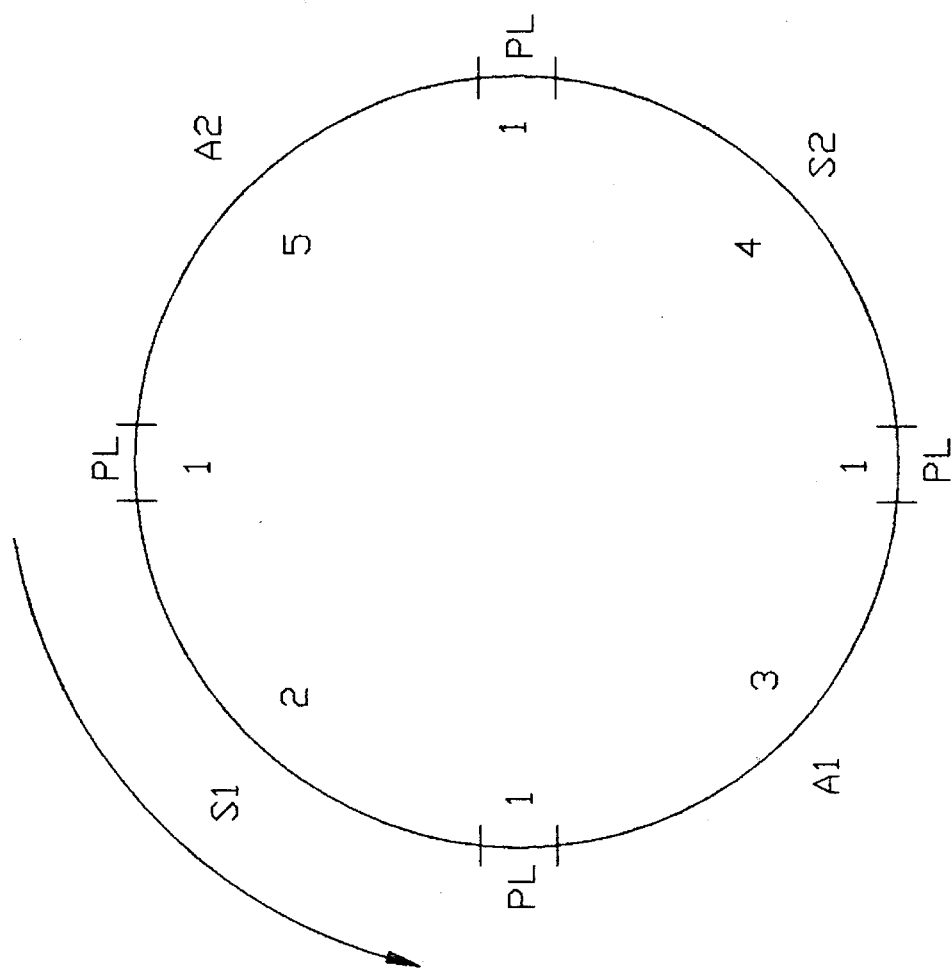
FIG. 9 is a logic circle diagram showing transponder protocol transmission.

FIG. 9 is a circle diagram that shows how the emulation protocols and the Pro link protocols are sequentially transmitted. Once the logic has determined that it is receiving a series of clock pulses, it checks the table to determine the type of response required, and replies with the proper emulation protocol followed by the Pro link protocol. As previously described, the Pro link protocol contains more data about the transponder then does the foreign emulation protocols. Furthermore the transponder logic will continue to stream data, using the proper emulation, until the interrogator stops sending interrogation clock pulses. The cessation of clock pulses informs the logic that the interrogator is satisfied. This is a normal manner in which interrogation terminates.

As explained, the logic knows whether to reply on the MIU data line or the read pad data lines based on which input port receives the interrogation clock pulses. This simple logic step means that considerable energy will be conserved because power is not wasted by sending data to unused ports. The scavenging of energy by the techniques described above mean that no (or very little) battery energy is used for communication. This technique extends battery life.

There has been disclosed heretofore in the above discussion the best embodiment and best mode of the present invention as presently contemplated and tested. It is to be understood that the examples given and the circuits given may be changed. Slightly different methods of attachment of assemblies to each other to form the instant invention may be made. Slight changes in use of the equipment may be made by varying the order in which the logic operates. Thus, modifications can be made to this invention without departing from the spirit of the invention and, if such modifications are so made, they should be construed as being within the spirit of the invention which is to provide a truly universal reader/transponder utility usage data gathering system.

We claim:

1. A method of operating a universal send/receive utility usage data gathering system having a transponder unit and a reader/interrogator unit, capable of passing radiated electromagnetic signals between each other: the transponder unit capable of generating internal software interrupts, responding to external usage pulse interrupts and interrogation signal interrupts, and providing a transponder data stream; having an internal clock, a tamper signal, a leak detection algorithm, a pulse and usage counter, a stored serial number, and internal flags: the interrogator unit capable of providing an interrogation signal, responding to the transponder data stream, internally storing the transponder data stream and responding to software and hardware interrupts; having a read trigger, an emulation protocol selector, a communication port, a programmable oscillator and programmable gain amplifiers, a selectable multi-tapped antenna loop, a received data display, and flags: comprising the transponder unit steps of:

a) listening for an interrupt in a low powered quiescent mode;

b) recognizing an interrupt;

c) waking up to logically process the interrupt;

d) determining the form of the interrupt, and,
if the interrupt is a software interrupt, then jumping to step (e);
if the interrupt is an external interrupt, then jumping to step (h);

e) incrementing the internal clock every four hours;

f) checking for tamper and leakage, and
if the tamper signal is present, then setting a tamper flag;
if leakage is detected, then setting the leak flag;

g) returning to step (a):

h) determining the type of external interrupt, and
if the interrupt is an external usage input, then jumping to step (i);
if the interrupt is an external interrogation signal then jumping to step (m);

i) arming the usage detection circuit;

j) awaiting the usage pulse;

k) processing and storing the pulse count in the usage counter, and l) returning to step (a):

m) synchronizing to the interrogation signal;

n) counting the pulse content of the interrogation signal;

o) determining the type of interrogator;

p) setting the emulation response to match the type of interrogator;

q) polling the usage counter and serial number;

r) converting usage count and serial number to a matched emulation data stream;

s) transmitting the matched emulated transponder data stream;

t) resetting software and flags; and u) returning to step (a).

2. A method of operating a universal send/receive utility usage data gathering system having a transponder unit and a reader/interrogator unit, capable of passing radiated electromagnetic signals between each other: the transponder unit capable of generating internal software interrupts, responding to external usage pulse interrupts and interrogation signal interrupts, and providing a transponder data stream; having an internal clock, a tamper signal, a leak detection algorithm, a pulse and usage counter, a stored serial number, and internal flags: the interrogator unit capable of providing an interrogation signal, responding to the transponder data stream, internally storing the transponder data stream and responding to software and hardware interrupts; having a read trigger, an emulation protocol selector, a communication port, a programmable oscillator and programmable gain amplifiers, a selectable multi-tapped antenna loop, a received data display, and flags: comprising the interrogator unit steps of:

a) listening for an interrupt in a low powered quiescent mode;

b) recognizing an interrupt;

c) waking up to logically process the interrupt;

d) determining the form of the interrupt, and,
    if the interrupt is a hardware interrupt, then jumping to step (e);
    if the interrupt is a software interrupt, then jumping to step (h);

e) looking at the selector switch to determine the emulation protocol;

f) jumping to step (h):

g) looking at the software command to determine emulation protocol;

h) generating the required emulation protocol;

i) setting the programmable oscillator frequency to the chosen emulated interrogation signal;

j) selecting the appropriate windings on the multi-tapped antenna loop;

k) setting the proper system programmable gain;

l) sending the correct emulated interrogation signal;

m) waiting for the transponder data stream response;

n) reformatting the transponder data stream;

o) storing the reformatted transponder data stream;

p) displaying the received transponder data;

q) retransmitting the received data to the communication port;

r) resetting internal logic and flags, and s) returning to step (a).

3. A method of operating a universal send/receive utility usage data gathering system having a foreign transponder unit and a universal reader/interrogator unit, capable of passing radiated electromagnetic signals between each other; the foreign transponder unit capable of generating internal software interrupts, responding to external usage pulse interrupts and interrogation signal interrupts, and providing transponder data streams; the universal interrogator unit capable of providing interrogation signals, responding to the transponder data streams, internally storing the transponder data streams, having a read trigger capable of providing a start read signal, and necessary communication ports or displays for transferring or reading stored transponder data streams; comprising the interrogator unit steps of:

a) waiting for the start read signal;

b) transmitting an interrogation signal to the foreign transponder;

c) waiting for the transponder data stream;

d) determining the type of transponder and the corresponding pattern of interrogator unit response;

e) generating the required emulation protocol;

f) transmitting the emulated interrogation signal;

g) waiting for the transponder data stream response;

h) permanently storing the transponder data stream for later retrieval or display; and i) returning to step (a).

4. The method of claim 3 wherein the universal interrogator contains a protocol table and associated protocol flag comprising the additional interrogator unit steps for step d):

d-1) clocking the transponder data stream;

d-2) comparing the clocked transponder data stream to the protocol table to determine the type of transponder;

d-3) setting the protocol flag.

5. The method of claim 3 wherein step (d) is skipped and the following steps are added after step (g):

g-1) determining if the transponder data stream response is valid;

g-2) if the data stream is valid skipping to step (h);

g-3) if the data stream is invalid, clocking the transponder data stream;

g-4) comparing the clocked transponder data stream to the protocol table to determine the type of transponder;

g-5) setting the protocol flag;

g-6) skipping to step (e).

6. A method of operating a universal send/receive utility usage data gathering system having a foreign transponder unit and a universal reader/interrogator unit, capable of passing radiated electromagnetic signals between each other; the foreign transponder unit capable of generating internal software interrupts, responding to external usage pulse interrupts and interrogation signal interrupts, and providing transponder data streams; the universal interrogator unit capable of providing interrogation signals, responding to the transponder data streams, internally storing the transponder data streams, and having a read trigger capable of providing a start read signal, a protocol table and associated protocol flag, and necessary communication ports or displays for transferring or reading stored transponder data streams; comprising the interrogator unit steps of:

a) waiting for the start read signal;

b) transmitting an interrogation signal to the foreign transponder;

c) waiting for the transponder data stream response;

d) determining if the transponder data stream response is valid;

e) if the data stream is valid, skipping to step (j);

f) if the data stream is invalid, clocking the transponder data stream;

g) comparing the clocked transponder data stream to the protocol table to determine the type of transponder;

h) generating required emulation protocol;

i) skipping to step (b);

j) permanently storing the transponder data stream for later retrieval or display; and k) returning to step (a).

7. The method of claim 6 wherein the protocol table contains a combination of emulated and licensed protocol, whereby the licensed protocol will provide true protocol, and step (h) is replaced with the following step:

h-1) generating required emulation protocol or true protocol.

8. The method of claim 6 whereby the following step is added after step (g):
   g-1) setting the protocol flag.
9. The method of claim 7 whereby the following step is added after step (g):
   g-1) setting the protocol flag.
10. The method of claim 6 wherein the interrogator unit further contains a programmable oscillator and programmable gain amplifiers and a selectable multi-tapped antenna loop and wherein the following steps are added before step (h):
   g'-1) setting the programmable oscillator frequency to the chosen emulated interrogation signal;
   g'-2) selecting the appropriate windings on the multi-tapped antenna loop;
   g'-3) setting the proper system programmable gain.
11. The method of claim 7 wherein the interrogator unit further contains a programmable oscillator and programmable gain amplifiers and a selectable multi-tapped antenna loop and wherein the following steps are added before step (h):
   g'-1) setting the programmable oscillator frequency to the chosen interrogation signal;
   g'-2) selecting the appropriate windings on the multi-tapped antenna loop;
   g'-3) setting the proper system programmable gain.
12. The method of claim 6 wherein the interrogator unit further contains a programmable oscillator and programmable gain amplifiers and a selectable multi-tapped antenna loop and wherein the following steps are added after step (g):
   g-1) setting the protocol flag;
   g-2) setting the programmable oscillator frequency to the chosen emulated interrogation signal;
   g-3) selecting the appropriate windings on the multi-tapped antenna loop;
   g-4) setting the proper system programmable gain.
13. The method of claim 7 wherein the interrogator unit further contains a programmable oscillator and programmable gain amplifiers and a selectable multi-tapped antenna loop and wherein the following steps are added after step (g):
   g-1) setting the protocol flag;
   g-2) setting the programmable oscillator frequency to the chosen interrogation signal;
   g-3) selecting the appropriate windings on the multi-tapped antenna loop;
   g-4) setting the proper system programmable gain.
14. A method of operating a universal send/receive utility usage data gathering system having a foreign transponder unit and a universal reader/interrogator unit, capable of passing radiated electromagnetic signals between each other; the foreign transponder unit capable of generating internal software interrupts, responding to external usage pulse interrupts and interrogation signal interrupts, and providing transponder data streams; the universal interrogator unit capable of providing interrogation signals, responding to the transponder data streams, internally storing the transponder data streams and responding to software and hardware interrupts having a read trigger capable of providing a start read signal, a protocol table and associated protocol flag, a programmable oscillator and programmable gain amplifiers, a selectable multi-tapped antenna loop, necessary communication ports or displays for transferring or reading stored transponder data streams; the protocol table containing a combination of unlicensed (emulated) and licensed protocols whereby the licensed protocols will provide true protocols, comprising the interrogator unit steps of:
   a) waiting for the start read signal;
   b) transmitting an interrogation signal to the foreign transponder;
   c) waiting for the transponder data stream response;
   d) determining if the transponder data stream response is valid;
   e) if the data stream is valid, skipping to step (n);
   f) if the data stream is invalid, clocking the transponder data stream;
   g) comparing the clocked transponder data stream to the protocol table to determine the type of transponder;
   h) setting the protocol flag;
   i) setting the programmable oscillator frequency to the chosen interrogation signal;
   j) selecting the appropriate windings on the multi-tapped antenna loop;
   k) setting the proper system programmable gain;
   l) generating required emulation protocol or true protocol, as determined by the protocol flag;
   m) skipping to step (b);
   n) permanently storing the transponder data stream for later retrieval or display; and
   o) returning to step (a).
15. The method of claim 1 wherein the transponder is capable of using the "Pro linK" protocol and wherein the following step is added after step (o):
   o-1) if the interrogator is of the "Pro linK" type, jumping to step (v) changing step (p) to the following step:
   p-1) if the interrogator is not of the "Pro linK" type, setting the emulation response to match the type of interrogator;
   adding the following steps after step (u):
   v) polling the usage counter, serial number, leakage detector, tamper detector, and other system parameters as provided by the transponder;
   w) convening usage count, serial number, leakage detector, tamper detector, and other system parameters to the "Pro linK" protocol data stream;
   x) transmitting the transponder data stream in "Pro linK" protocol; and
   y) jumping to step (t).
16. The method of claim 1 wherein the transponder is using a licensed foreign manufacturer's protocol, whereby the licensed protocol will provide true protocol and wherein the following step is added after step (o):
   o-1) if the interrogator is using licensed protocol, jumping to step (v);
   and adding the following steps after step (u):
   v) polling the usage counter, serial number, tamper detector, and other system parameters that the licensed protocol provides;
   w) convening usage count, serial number, tamper detector, and system parameters to the licensed protocol data stream;
   x) transmitting the transponder data stream in licensed protocol; and
   y) jumping to step (t).
17. The method of claim 1 wherein the transponder is capable of using "Pro linK" protocol, unlicensed (emulated)

protocols and licensed protocols, whereby any of the licensed protocols will provide true protocol and wherein the following steps are added after step (o):

o-1) if the interrogator is using licensed protocol, jumping to step (v);

o-2) if the interrogator is using "Pro linK" protocol, jumping to step (z);

changing step (p) to read:

p-1) if the interrogator is not using licensed protocol, setting the emulation response to match the type of interrogator;

and adding the following steps after step (u):

v) polling the usage counter, serial number, tamper detector, and other system parameters that the licensed protocol provides;

w) convening usage count, serial number, tamper detector, and system parameters to the licensed protocol data stream;

x) transmitting the transponder data stream in licensed protocol;

y) jumping to step (t);

z) polling the usage counter, serial number, leakage detector, tamper detector, and other system parameters as provided by the transponder;

aa) converting usage count, serial number, leakage detector, tamper detector, and system parameters to the "Pro linK" protocol data stream;

bb) transmitting the transponder data stream in "Pro linK" protocol; and cc) jumping to step (t).

* * * * *